(12) United States Patent
Hino

(10) Patent No.: US 8,179,560 B2
(45) Date of Patent: May 15, 2012

(54) IMAGE PROCESSING APPARATUS AND IMAGE PROCESSING METHOD

(75) Inventor: Yasuhiro Hino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/365,097

(22) Filed: Feb. 3, 2009

(65) Prior Publication Data

US 2009/0201518 A1    Aug. 13, 2009

(30) Foreign Application Priority Data

Feb. 12, 2008   (JP) ................................. 2008-030587

(51) Int. Cl.
*G06K 15/02*    (2006.01)
(52) U.S. Cl. ...... 358/1.2; 358/1.13; 358/1.15; 358/1.16; 358/528; 358/451; 358/504; 358/406; 382/298; 382/299; 709/220; 709/228; 709/246
(58) Field of Classification Search ........................ None
See application file for complete search history.

(56) References Cited

U.S. PATENT DOCUMENTS

| | | | |
|---|---|---|---|
| 7,990,569 B2 * | 8/2011 | Hino .............................. 358/1.2 |
| 2006/0007481 A1 | 1/2006 | Kato et al. | |
| 2006/0238790 A1 * | 10/2006 | Chapman ..................... 358/1.13 |
| 2007/0133030 A1 * | 6/2007 | Kanamoto .................... 358/1.13 |
| 2007/0277116 A1 * | 11/2007 | Nakajima ..................... 715/771 |
| 2009/0015878 A1 | 1/2009 | Hino | |
| 2009/0284787 A1 * | 11/2009 | Imai ............................ 358/1.15 |

FOREIGN PATENT DOCUMENTS

| | | |
|---|---|---|
| JP | 11-170657 | 6/1999 |
| JP | 2006-023942 A | 1/2006 |
| JP | 2007-108861 | 4/2007 |

* cited by examiner

*Primary Examiner* — Chan S Park
*Assistant Examiner* — John Wallace
(74) *Attorney, Agent, or Firm* — Fitzpatrick, Cella, Harper & Scinto

(57) ABSTRACT

An image processing apparatus is provided for realizing a higher speed print-out of a scan image. It is determined whether an input data type stored in metadata of document data is PDL or not (S1609). If the input data type is "full-page image", page data is divided into blocks and a thread is allotted to each of the blocks (S1608). If the input data type is not "full-page image", the process goes to S1603. Subsequently, DL data is generated from vector data in the document, the DL data is added to the document, and the DL data is rendered into a bit map (S1603 to S1605). If the threads are processed by a plurality of processors, respectively, it becomes possible to carry out the processing in parallel and thereby to realize higher speed processing, when the input data type is "full page image".

7 Claims, 26 Drawing Sheets

DOCUMENT GENERATION PROCESSING FROM IMAGE

DOCUMENT GENERATION AND PRINT PROCESSING FROM PDL

| P | D | L |

XOR         AND         XOR

Clip

IMAGE PROCESSING APPARATUS AND IMAGE PROCESSING METHOD

BACKGROUND OF THE INVENTION

1. Field of the Invention

The present invention relates to an image processing apparatus or the like which forms and outputs an image of scan data and page description data.

2. Description of the Related Art

Japanese Patent Laid-Open No. 2006-23942 discloses a technique converting a bit map image which is input with an image input device, into drawing data which does not depend on a resolution of the image input device. Such processing converting bit map image into resolution-independent data is called vector conversion or vectorization, and the data obtained as a result of the vector conversion is called vector data. By utilizing this technique, it is possible to convert the input image into the resolution-independent vector data, and to reuse the image in an optional size without degrading the image.

Further, Japanese Patent Laid-Open No. H11-170657 (1999) discloses a technique which performs drawing processing in parallel by distributing PDL (Page Description Language) data to a plurality of drawing processors.

Moreover, Japanese Patent Laid-Open No. 2007-108861 discloses a technique which switches a CPU or a frequency to be used, between PDL data and raster data.

Here, the vector data generated from a scan image has a characteristic that this vector data is simple drawing data but has a lot of redundancy compared to the vector data generated from the PDL data, since the original of the former vector data is image data.

However, when the vector data generated from the scan image is printed out, drawing development processing thereof is performed as same as for the PDL data regardless of the original data, and therefore, there has been a problem that the drawing development processing efficiency is low in the vector data generated from the scan image.

Further, for distributing the PDL data to the plurality of drawing processors, it is necessary to analyze page data again after scanning the page data and performing processing to divide the PDL data, and therefore, there has been a problem that an excess time is required for dividing the PDL data.

Still further, for displaying the vector data on a PC, it is necessary to convert the vector data into a universal format such as PDF (Portable Document Format). However, there has been a problem that the universal format data, which has been converted originally from the PDL data, sometimes becomes considerably redundant after the conversion because of a difference in drawing models.

Moreover, when search is made for the stored vector data, in which data generated from the PDL data is mixed, there has been a problem that the search with a character string cannot be made as desired.

The technique disclosed in Japanese Patent Laid-Open No. 2007-108861 does not provide any method for solving the problem for such various functions other than PDL data analysis and rendering.

SUMMARY OF THE INVENTION

An object of the present invention is to provide a higher speed print-out for the scan image. Further, another object of the present invention is to provide an improved efficiency of conversion from the PDL data to the universal format. Moreover, still another object of the present invention is to provide an improved convenience in document search.

For achieving the above objects, an image processing apparatus of the present invention includes: a reception component receiving PDL data from an external apparatus; an input component inputting scan image data from a scanner; a first conversion component converting at least a part of an area in the data input by the reception component and the input component into resolution-independent data which does not depend on a resolution of the input component; a second conversion component converting subsidiary information obtained when generating the resolution-independent data into additional information data as additional information which is not subjected to print processing; a component retaining the resolution-independent data and the additional information data in association with each other; a component retaining information indicating which of the image data and the PDL data is a type of the data input into the first conversion component; and a component switching data conversion processing depending on the type of the data input into the first conversion component.

Further, an image processing method of the present invention includes the steps of: a reception component receiving PDL data from an external apparatus; an input component inputting scan image data from a scanner; converting at least a part of an area of the data input by the reception component and the input component into resolution-independent data which does not depend on a resolution of the input component; converting subsidiary information obtained when generating the resolution-independent data into additional information data as additional information which is not subjected to print processing; retaining the resolution-independent data and the additional information data in association with each other; retaining information indicating which of the image data and the PDL data is a type of the data input by the reception component and the input component; and switching data conversion processing depending on the data type.

Still further, a computer-readable recording medium of the present invention records a program for causing a computer to execute a method comprising the steps of: a reception component receiving PDL data from an external apparatus; an input component inputting scan image data from a scanner; converting at least a part of an area of the data input by the reception component and the input component into resolution-independent data which does not depend on a resolution of the input component; converting subsidiary information obtained when generating the resolution-independent data into additional information data as additional information which is not subjected to print processing; retaining the resolution-independent data and the additional information data in association with each other; retaining information indicating which of the image data and the PDL data is a type of the data input by the reception component and the input component; and switching data conversion processing depending on the data type.

Moreover, a program of the present invention causes a computer to execute a method including the steps of: a reception component receiving PDL data from an external apparatus; an input component inputting scan image data from a scanner; converting at least a part of an area of the data input by the reception component and the input component into resolution-independent data which does not depend on a resolution of the input component; converting subsidiary information obtained when generating the resolution-independent data into additional information data as additional information which is not subjected to print processing; retaining the resolution-independent data and the additional information data in association with each other; retaining information indicating which of the image data and the PDL data is a type of the data input by the reception component and the input component; and switching data conversion processing depending on the data type.

According to the present invention, it becomes possible to realize a high speed print-out by switching processing depending on an original data type of the generated vector data.

Further, it becomes possible to realize more efficient conversion from the vector data to the universal format similarly by switching the processing depending on the original data type.

Moreover, it becomes possible to improve convenience in document search similarly by switching the processing depending on the original data type.

Further features of the present invention will become apparent from the following description of exemplary embodiments (with reference to the attached drawings).

BRIEF DESCRIPTION OF THE DRAWINGS

FIG. 21A is a diagram showing features of character strings generated from scan image and character strings generated from PDL data in an embodiment;

FIG. 21B is a diagram showing features of character strings generated from scan image and character strings generated from PDL data in an embodiment;

DESCRIPTION OF THE EMBODIMENTS

Hereinafter, the best mode for implementing the present invention will be described with reference to the drawings. Note that a constituent described in this embodiment is only an exemplification and is not intended to limit the scope of this invention thereto.

[Embodiment 1]

<Configuration of an Image Processing Apparatus>

Figure 1:
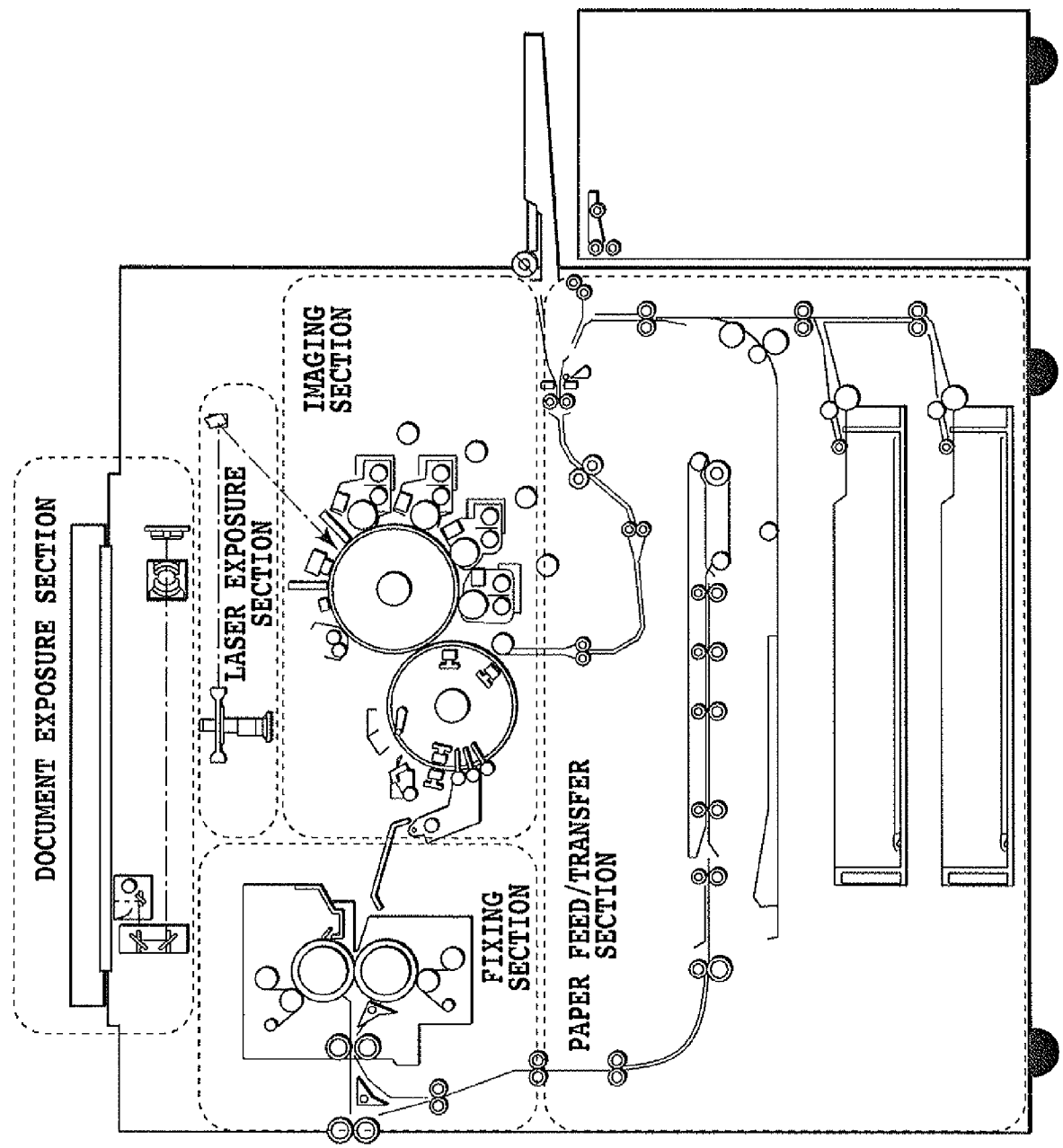
FIG. 1 is a side cross-sectional view showing a structure of a printing machine (MFP) according to an embodiment of the present invention.

There will be described a configuration of a 1D color MFP (Multi Function Peripheral), to which the present example is preferably applied, with reference to FIG. 1.

The 1D color MFP includes a scanner, a laser exposure section, a photo-sensitive drum, an imaging section, a fixing section, a paper feed/transfer section, and a printer controller (not shown in the drawing) which controls these sections.

The scanner reads a document image of a document placed on a platen optically by illuminating the document image, and converts the image into an electrical signal to generate image data.

The laser exposure section inputs a light beam, such as a laser beam, modulated according to the image data onto a rotating polygon mirror which rotates in a constant angular speed, and irradiates the photo-sensitive drum with a reflected scan beam thereof.

The imaging section drives and rotates the photo-sensitive drum, charges it with a charger, develops a latent image formed on the photo-sensitive drum by the laser exposure section with a toner, and transfers the toner image onto a sheet. Then, the imaging section performs a series of electrophotographic processes for imaging, such as a process to collect minute toners remaining on the photo-sensitive drum without being transferred. At this time, while the sheet is winded on a predetermined position of a transfer belt and rotates four times, each of development units (development stations), which have the toners of magenta (M), cyan (C), yellow (Y), and black (K), respectively, performs the above electrophotographic process repeatedly and sequentially in turn. After the four time rotations, the sheet, to which the full-color four-tonner image is transferred, is removed from a transfer drum and transferred to the fixing section.

The fixing section is configured with a combination of a roller and a belt and contains a heat source such as a halogen heater, and makes the toners on the sheet, to which the toner image is transferred by the imaging section, to fuse by heat and pressure and fixes the toner image.

The paper feed/transfer section has one or more sheet storage represented by a sheet cassette or a paper deck, separates one sheet from a plurality of sheets stored in the sheet storage according to an instruction from the printer controller, and transfers the sheet to the imaging section and then to the fixing section. The sheet is winded to the transfer drum in the imaging section and transferred to the fixing section after having rotated four times. During the four time rotations, each of the above YMCK toner images is transferred onto the sheet. Further, when images are to be formed on both sides of the sheet, the sheet having passed through the fixing section is controlled to be transferred along a transfer path which transfers the sheet to the imaging section again.

The printer controller communicates with an MFP controller which controls the entire MFP, carries out control according to an instruction thereof, and also, while managing a state in each of the above sections of scanner, laser exposure, imaging, fixing, and paper feed/transfer, provides instructions so as to make these entire sections preserve harmony and operate smoothly.

<Configuration of the Controller Unit>

Figure 2:
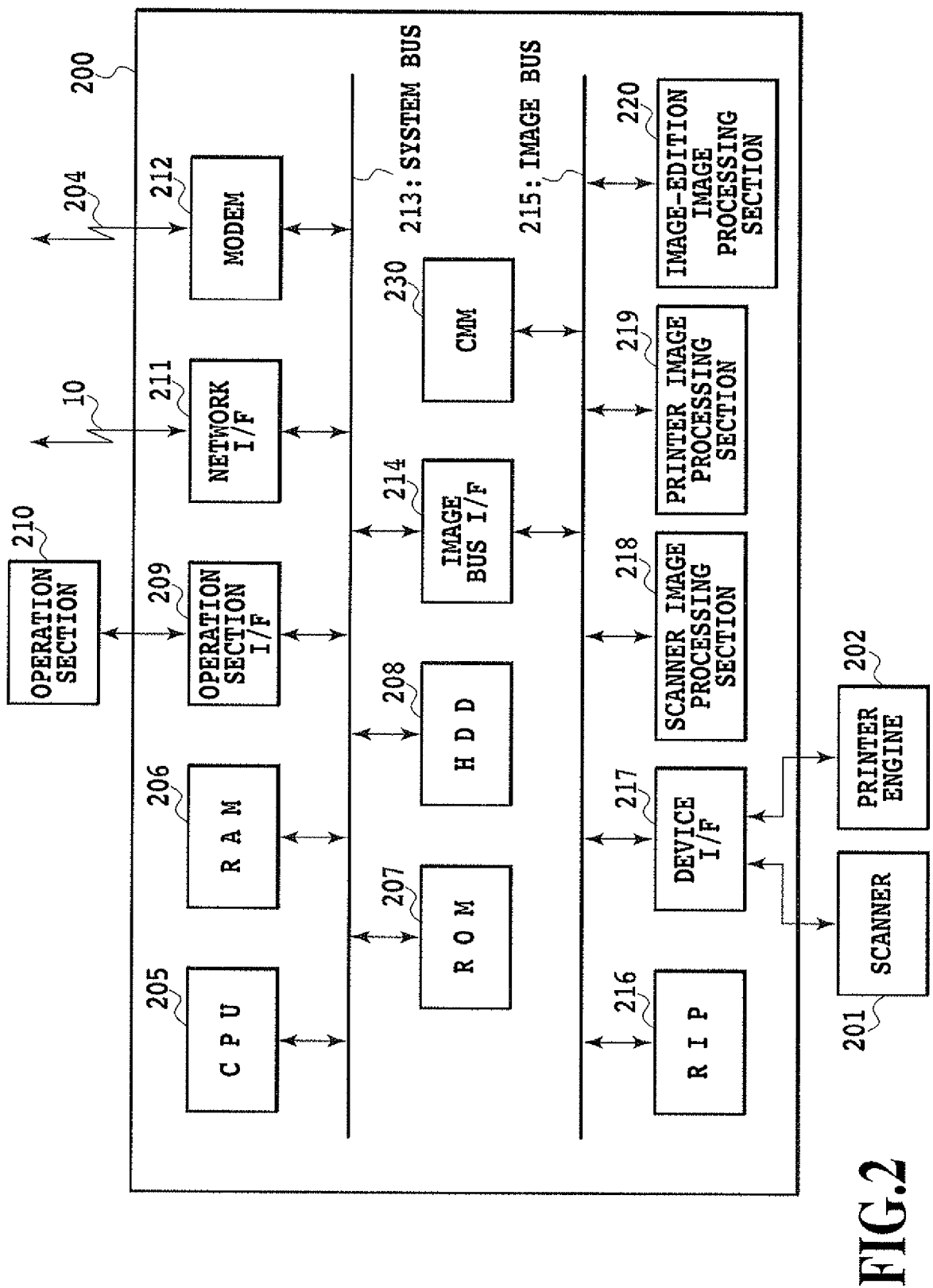
FIG. 2 is a block diagram showing a configuration example of a control unit in each equipment of an embodiment.

FIG. 2 is a block diagram showing a configuration example of the MFP controller unit (controller) in the present embodiment. In FIG. 2, a control unit 200 is connected with a scanner 201 of an image input device and a printer engine 202 of an image output device, and carries out controls for image data read-out and print-out. Further, the control unit 200 is connected to a LAN 10 or a public line 204 and thereby performs control for input and output of image information or device information via the LAN 10.

A CPU 205 is a central processing unit for controlling the entire MFP. A RAM 206 is a system work memory for the operation of the CPU 205 and also an image memory for storing input image data temporarily. Further, a ROM 207 is a boot ROM and stores a boot program of the system. An HDD 208 is a hard-disk drive and stores system software for various kinds of processing, the input image data, etc. An operation section I/F 209 is an interface part for an operation section 210 which has a display screen capable of displaying image data or the like, and outputs operation screen data to the operation section 210. Further, the operation section I/F 209 performs a function to transfer information, which is input by an operator from the operation section 210, to the CPU 205. A network interface 211 is realized by a LAN card or the like, for example, and is connected to the LAN 10 to input or output information from or to an external apparatus. Furthermore, a modem 212 is connected to the public line 204 and inputs or outputs information from or to an external apparatus. The above units are arranged on a system bus 213.

An image bus I/F 214 is an interface for connecting the system bus 213 and an image bus 215 which transfers the image data in a high speed, and is a bus bridge converting a data structure. To the image bus 215, there are connected a raster image processor (RIP) 216, a device I/F 217, a scanner image processing section 218, a printer image processing section 219, an image-edition image processing section 220, and a color management module (CMM) 230.

The raster image processor (RIP) 216 develops a page description language (PDL) code or vector data to be described below, into an image. The device I/F 217 connects the scanner 201 and the printer engine 202 to the control unit 200, and carries out synchronization/non-synchronization conversion of the image data.

Further, the scanner image processing section 218 performs various kinds of processing such as correction, modification, and edition, on scan image data input from the scanner 201. The printer image processing section 219 performs processing such as correction and resolution conversion according to a printer engine 202, on the image data to be printed out. The image-edition image processing section 220 performs various kinds of image processing such as image data rotation, image data compression/decompression processing. The color management module (CMM) 230 is a dedicated hardware module performing color conversion processing (also called color space conversion processing) based on a profile or calibration data on the image data. The profile is information such as a function to convert color image data represented by a color space which depends on a device into a color space (e.g., Lab or the like) which does not depend on the device. The calibration data is data for modifying a color reproduction characteristic of the scanner 201 or the printer engine 202 in the MFP.

<Configuration of Controller Software>

Figure 3:
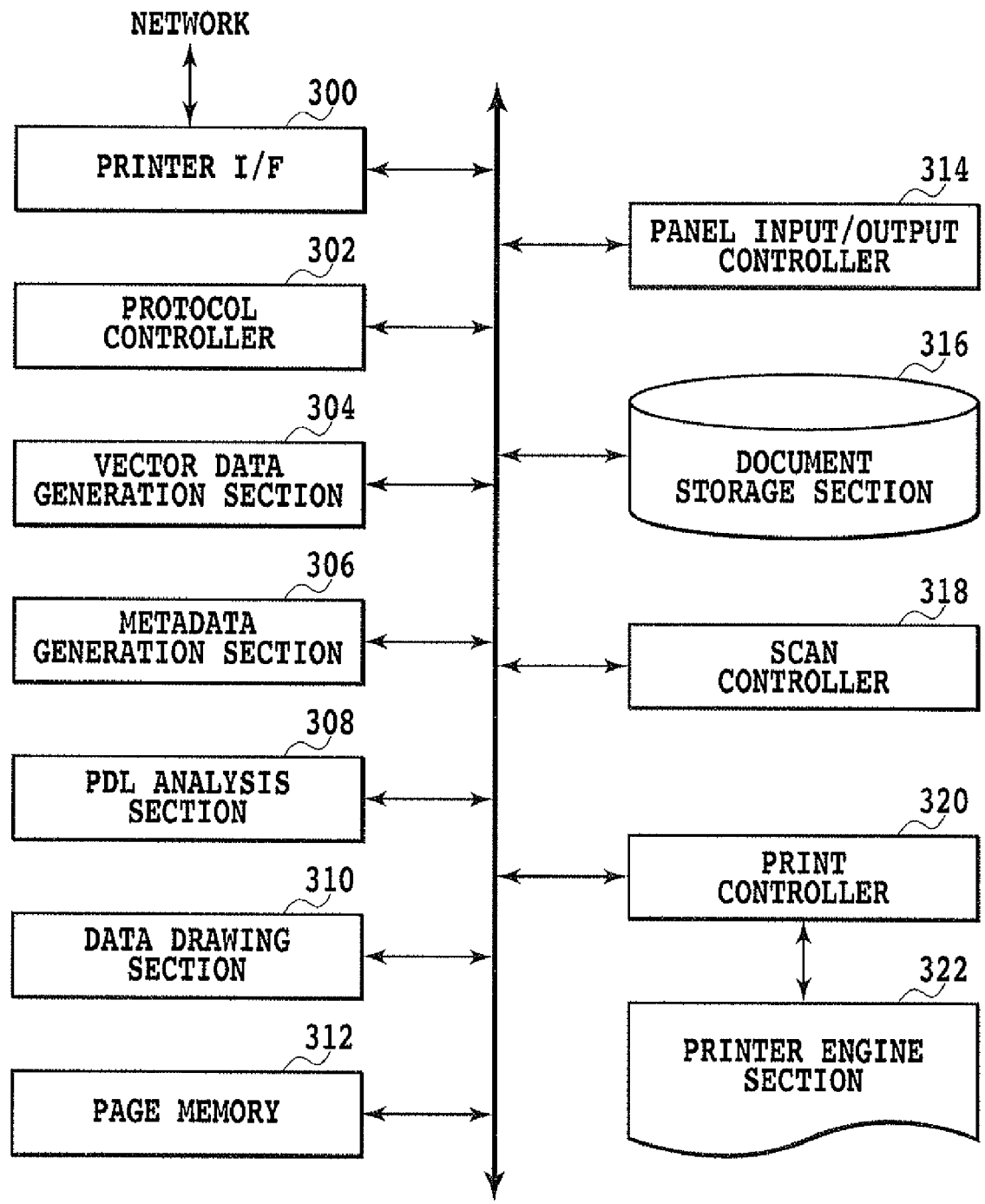
FIG. 3 is a block diagram showing an example of a controller software configuration in an embodiment.

FIG. 3 is a block diagram showing a configuration of controller software which controls the operation of the MFP.

A printer interface 300 is a unit for input and output from and to the outside. A protocol controller 302 is a unit to perform communication with the outside by analyzing and transmitting a network protocol.

A vector data generation section (first conversion unit) 304 generates vector data, which is a drawing description without depending on a resolution, from a bit map image (vectorization).

A metadata generation section (second conversion unit) 306 generates subsidiary information, which is obtained in the process of the vectorization, as metadata. The metadata is additional information data for searching and is not necessary for drawing processing.

A PDL analysis section 308 is a unit to analyze the PDL data and to convert the PDL into an intermediate code (DisplayList, called "DL" hereinafter) which is a format to be processed more easily. The intermediate code data generated in the PDL analysis section 308 is transferred to a data drawing section 310 to be processed. The data drawing section 310 develops the above intermediate code data into bit map data, and the developed bit map data is drawn in a page memory 312 sequentially.

The page memory 312 is a volatile memory retaining the bit map data developed by a renderer temporarily.

A panel input/output controller controls input and output of the operation panel.

A document storage section 316 is a unit storing a data file including the vector data, DL data, and metadata for each block (job) unit of an input document, and is realized by a secondary storage unit such as a hard-disk. Note that the present example calls this data file "document".

A scan controller 318 performs various kinds of processing such as correction, modification, and edition, on the image data input from the scanner.

A printer controller 320 converts contents of the page memory 312 into a video signal, and transfers an image to the printer engine section 322. The printer engine section 322 is a print mechanical section for forming a permanent visible image of the received video signal on a recording paper.

<Data Processing of the Controller Unit>

Next, there will be described how the vector data, DL data, and metadata, which compose the document, are generated.

Figure 4:
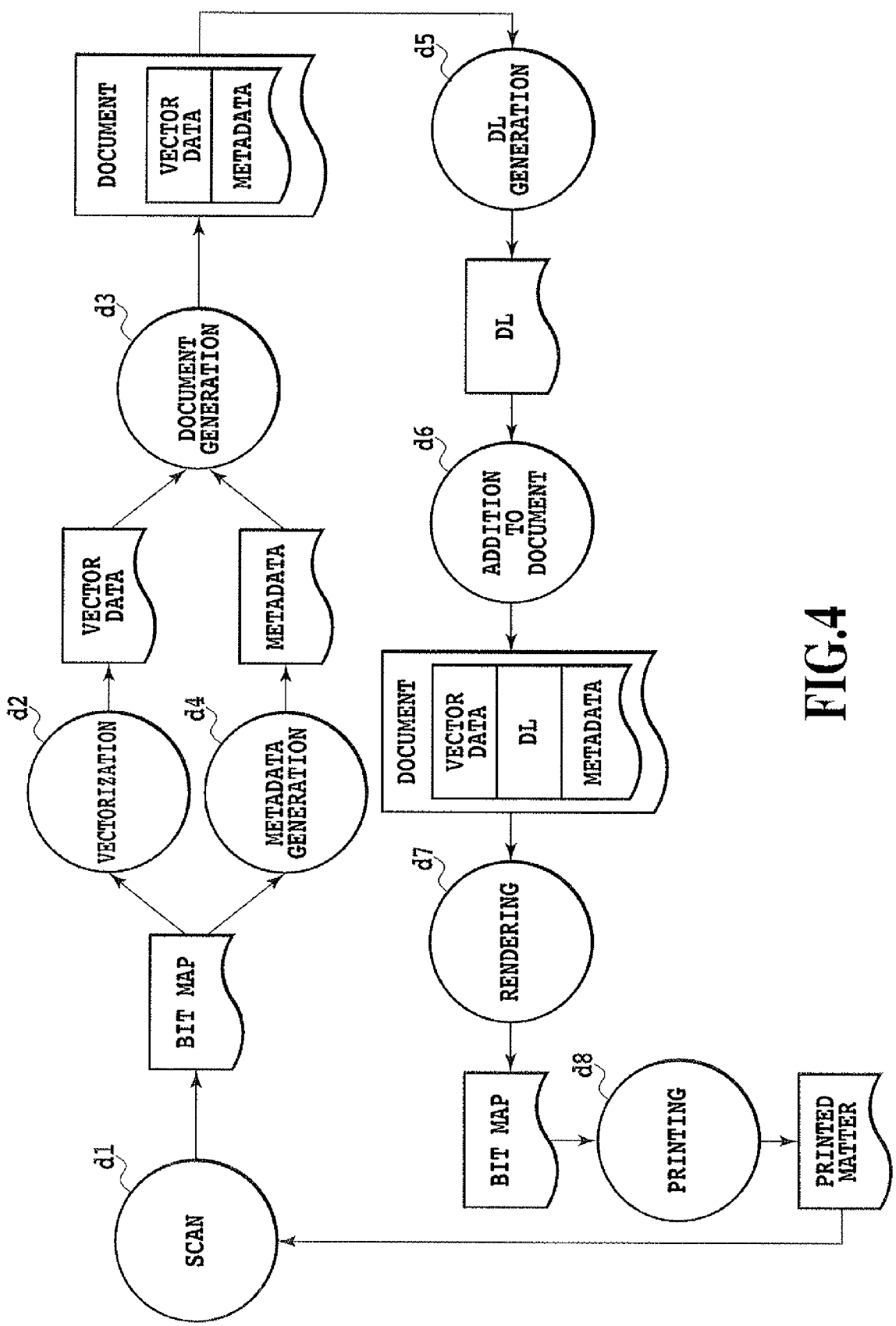
FIG. 4 is a diagram showing a data flow in a control unit in an embodiment.
Figure 5:
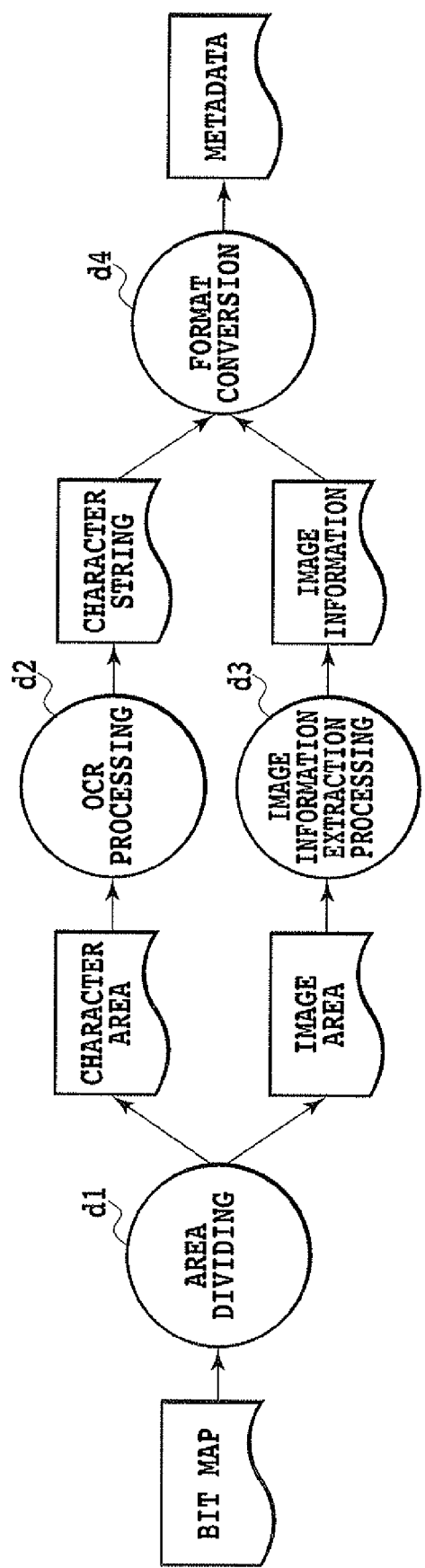
FIG. 5 is a diagram showing a data flow in a control unit in an embodiment.
Figure 6:
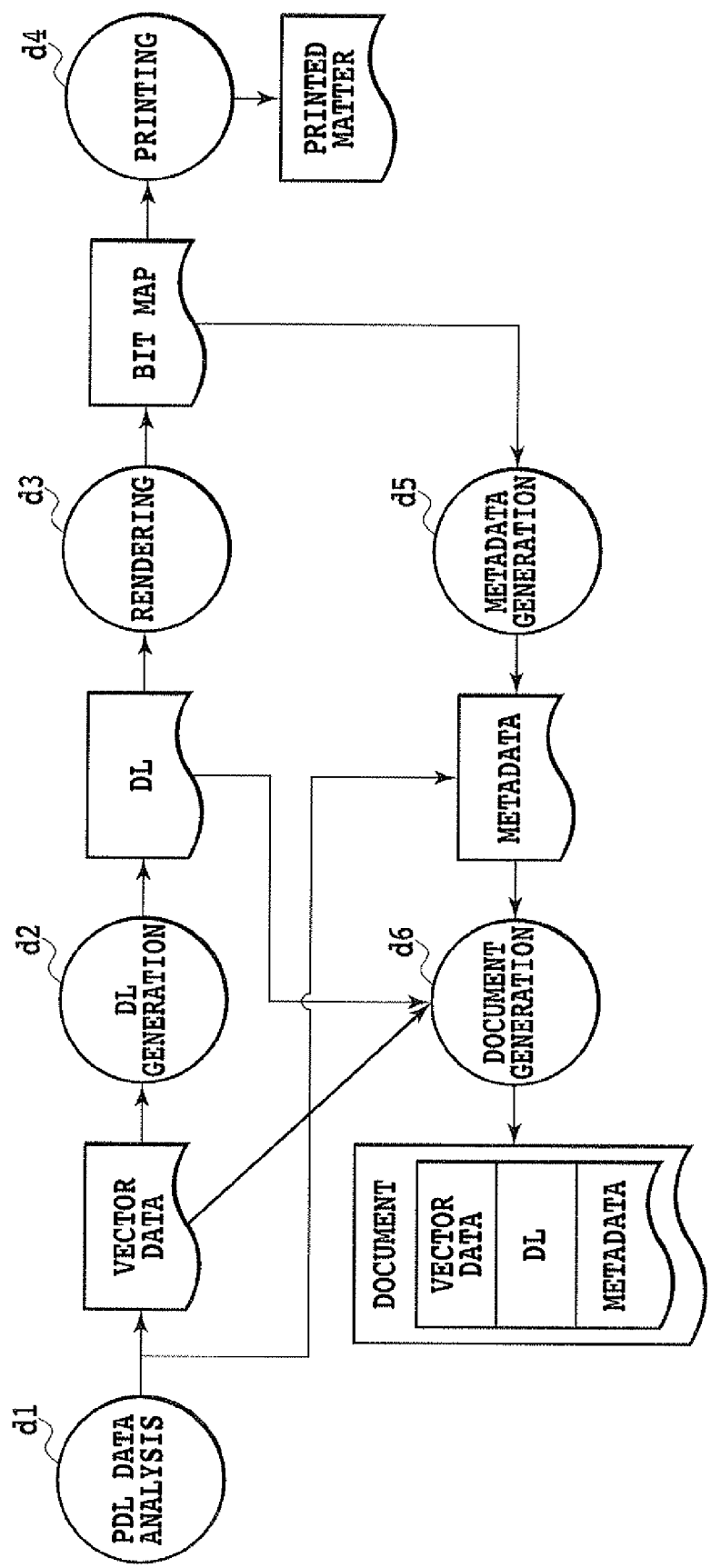
FIG. 6 is a diagram showing a data flow in a control unit in an embodiment.

FIG. 4, FIG. 5, and FIG. 6 show a data flow of the control unit 200 in the present embodiment.

FIG. 4 is a data flow in copy operation.

First, scan processing d1 converts a paper document set in a document exposure section into bit map data. Subsequently, vectorization processing d2 and metadata generation processing d4 generate the vector data and the accompanying metadata, each of which does not depend on a resolution, from the bit map data, respectively. Specific generation methods of the vector data and the metadata will be described hereinafter.

Next, document generation processing d3 generates the document of the vector data and the metadata which are associated with each other. Subsequently, DL generation processing d5 generates the DL data from the vector data in the document, and stores the generated DL data into the document and also sends the DL data to rendering processing d7 to develop the DL data into the bit map data.

Print processing d8 records the developed bit map onto a paper medium to form a printed matter. Note that, by setting the output printed matter in the document exposure section again, it is possible to carry out the processing from the scan processing d1.

FIG. 5 shows a specific data flow of the metadata generation processing d4 shown in FIG. 4. First, area dividing processing d1 carries out area dividing of the bit map.

The area dividing is processing to analyze the input bit map image data and to divide the image data into areas by a block of an object included in the image, and then to classify the areas by determining an attribute of each of the areas. The attributes include TEXT, PHOTO, LINE, PICTURE, TABLE, etc.

Figure 7:
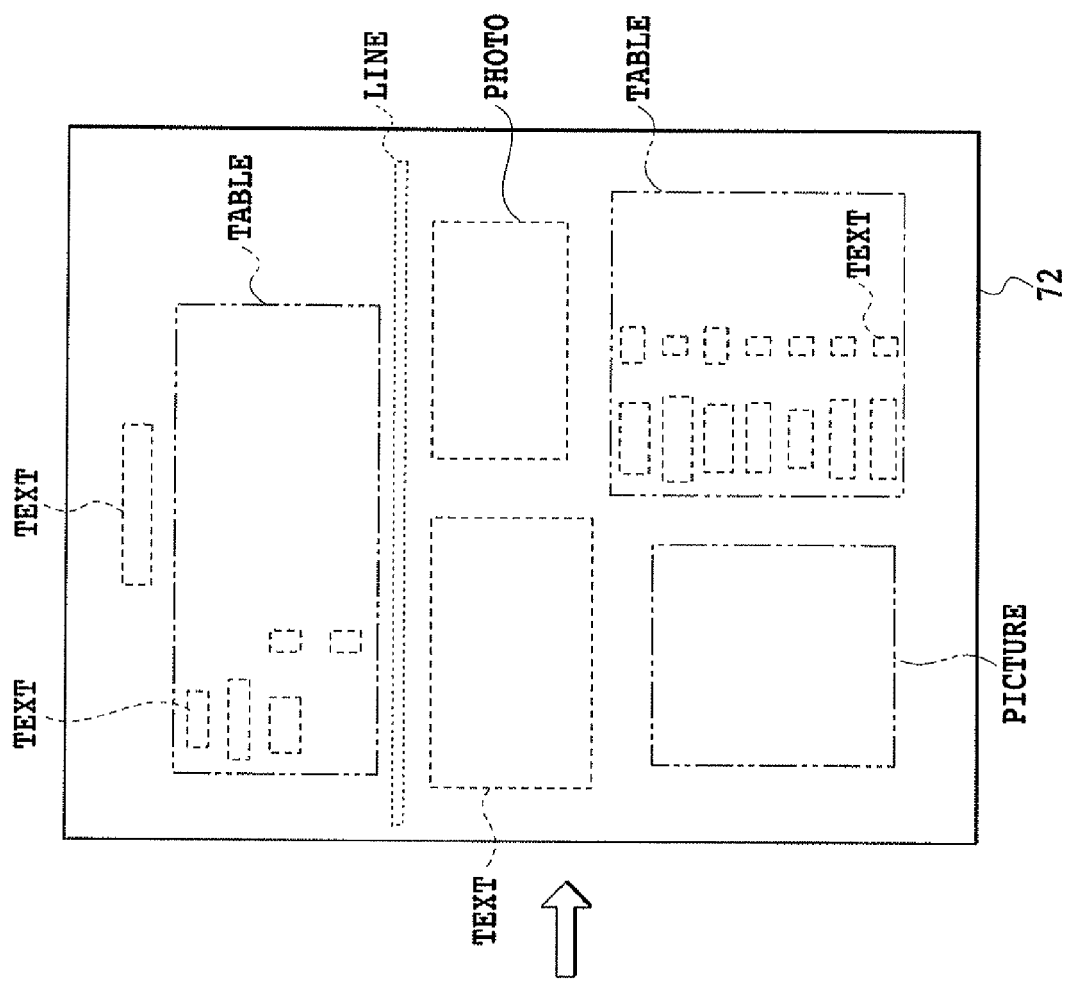
FIG. 7 is a diagram showing an example of a case to perform area dividing on input image in an embodiment.
Figure 7:
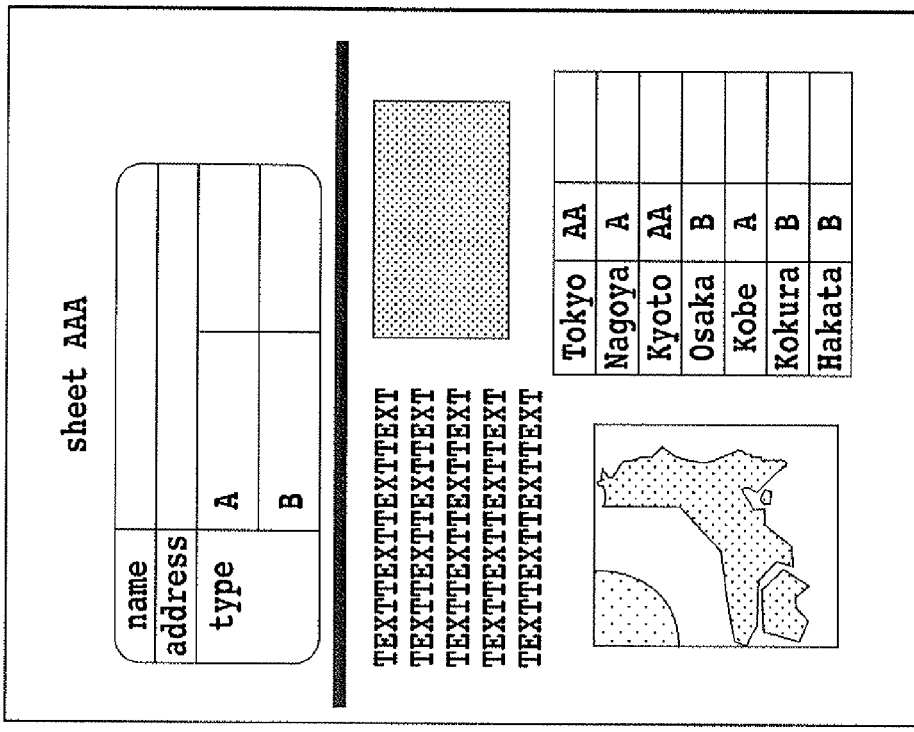

Here, FIG. 7 shows an example of a case to perform area dividing on the input image. A determination result 72 is a result of performing the area dividing on the input image 71. In the determination result 72, an area enclosed by a dotted line represents one object unit resulted from the image analysis, and the kind of the attribute attached to each of the objects is a determination result of the area dividing.

Among areas classified into the attributes, an area of the attribute TEXT is subjected to character recognition processing by OCR processing d2 and converted into a character string. That is, this character string is one printed on a paper. On the other hand, among the areas classified into the attributes, the area of the attribute PHOTO is converted into image information through image information extraction processing d3. The image information is a character string representing a feature of the image such as a character string of "flower" and "face", for example. For extracting the image information, it is possible to use a general image processing technique such as an image feature quantity (pixel frequency or density composing the image) detection or face recognition.

The generated character string and image information are arranged into a data format to be described below by format conversion processing d4, and the metadata is generated.

FIG. 6 shows a data flow of PDL print. The PDL print is a printer operation of receiving and outputting the PDL data generated by a printer driver on a PC (Personal Computer), when application software on the PC instructs printing.

First, the received PDL data is analyzed by PDL data analysis processing d1 and the vector data is generated.

Next, DL data generation processing d2 generates the DL data from the vector data and the generated DL data is stored into the document and also sent to rendering processing d3 to be developed into the bit map. The developed bit map is recorded on a paper medium by print processing d4 to form a printed matter. The vector data and DL data generated in this process are stored into the document by document generation processing d6.

Further, from the bit map generated by the rendering processing d3, metadata generation processing d5 generates the character string and image information as the metadata as same as in the copy operation, and stores the metadata into the document.

Meanwhile, the PDL has a various kinds such as LIPS (LBP Image Processing System) and PS (PostScript), and some of them include character string information. In this case, the metadata is generated from the character string in the PDL analysis and is stored into the document.

Next, document generation processing and print processing will be described using flowcharts.

Figure 8:
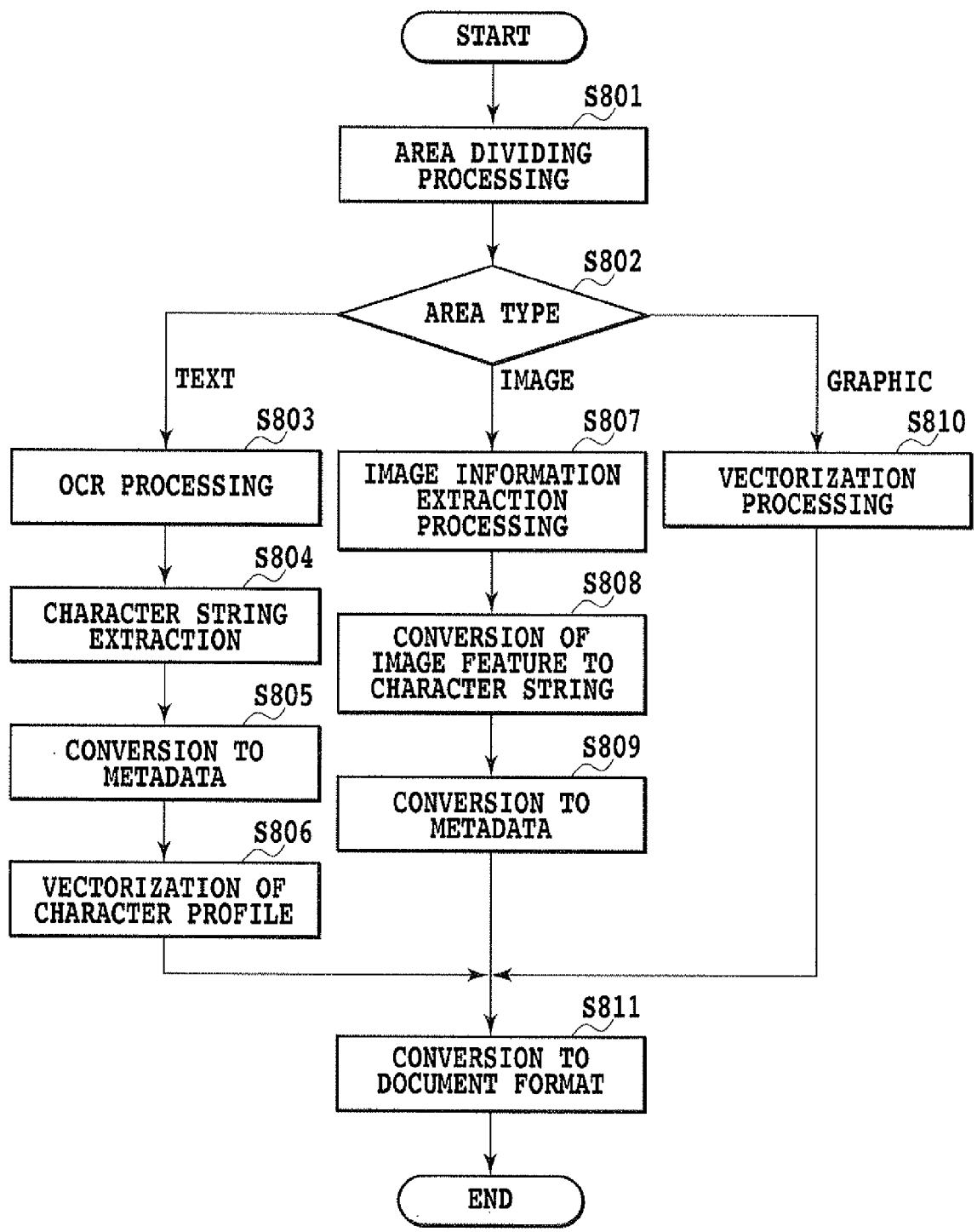
FIG. 8 is a flowchart showing document generation processing in an embodiment.

FIG. 8 shows the document generation processing. This processing is one to receive the bit map data and to generate the document composed of the vector data, DL data, and metadata.

First, Step S801 performs the above described area dividing processing. Subsequently, Step S802 classifies types of areas (area attributes) into TEXT, GRAPHIC, and IMAGE and performs different processing for each of the types. FIG. 7 shows an example of classifying the area attributes into TEXT, PHOTO, LINE, PICTURE, and TABLE, but the area attributes of PHOTO and PICTURE and the area attributes of LINE and TABLE in FIG. 7 are classified into IMAGE and GRAPHIC, respectively.

If the area attribute is TEXT, the process goes to Step S803 and the OCR processing is performed, and then the Step S804 extracts the character string. After that, Step S805 converts the character string into the metadata and the process goes to Step S806 which converts a recognized character outline into the vector data (vectorization).

Here, a little more description will be added.

The metadata generated from the character string is a sequence of character codes, but the sequence of the character codes is necessary information for keyword search.

However, the OCR processing can recognize the character code but cannot recognize a font such as "Mincho" and "Gothic", a character size such as "10 pt" and "12 pt", or character decoration such as "italic" and "bold". Accordingly, it is necessary for drawing to retain the character outline as the vector data instead of the character code.

On the other hand, if the area attribute is IMAGE in Step S802, the process goes to Step S807 and the image information extraction processing is performed.

The Step S807 detects the image feature using the general image processing technique such as the image feature quantity detection or the face recognition as described above. Subsequently, the process goes to Step S808 and the detected image feature is converted into the character string. This conversion is easy to perform by retaining a table of a feature parameter and the character string.

After that, Step S809 converts the character string into the metadata.

For the area attribute of IMAGE, the vectorization is not performed and the image data is retained as is in the vector data.

If the area attribute is GRAPHIC in Step S802, the process goes to Step S810 and the vectorization processing is performed.

Step S811 converts the metadata or the vector data into the document format.

Figure 9:
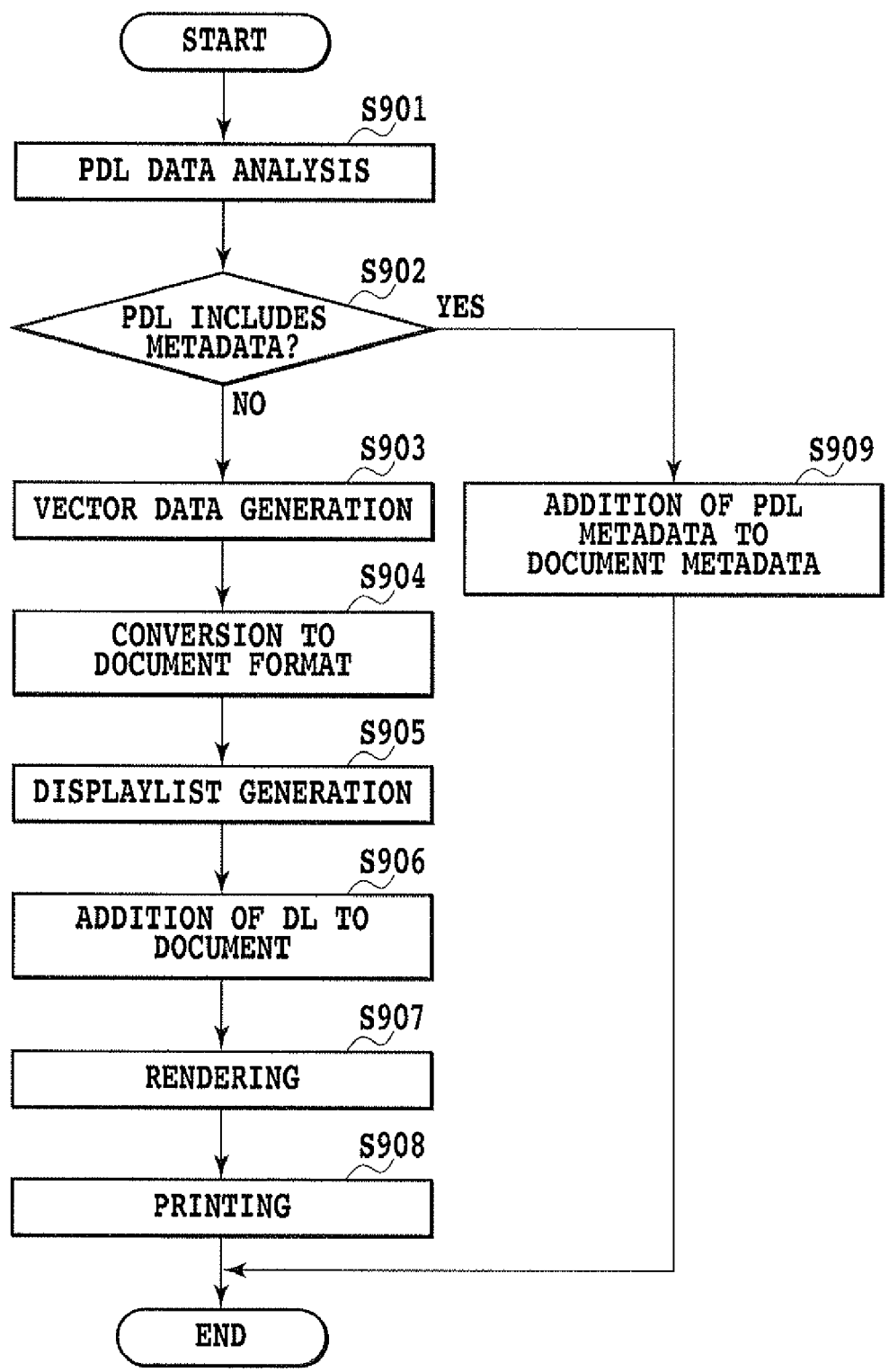
FIG. 9 is a diagram showing document generation and print processing from PDL data.

FIG. 9 shows the document generation and print processing from the PDL data. This processing receives the PDL data and generates the document to output a print.

First, Step S901 analyzes the PDL data. If the metadata such as the character string information is found to be included in the PDL data during the analysis, the process goes to Step S909 and the information of the PDL is added to the metadata.

On the other hand, in Step S902, if the PDL data includes data other than the metadata such as the character string information, the process goes to Step S903 and the data is converted into the vector data. Then, the process goes to Step S904 and the document is generated.

Next, Step S905 generates the DL data and the process goes to Step S906 which adds the generated DL data to the document.

The above flow generates the document, and the whole processing is completed after the subsequent rendering processing in Step S907 and print processing to a paper medium in Step S908.

<Document Data Structure>

Next, a structure of the document will be described.

Figure 11:
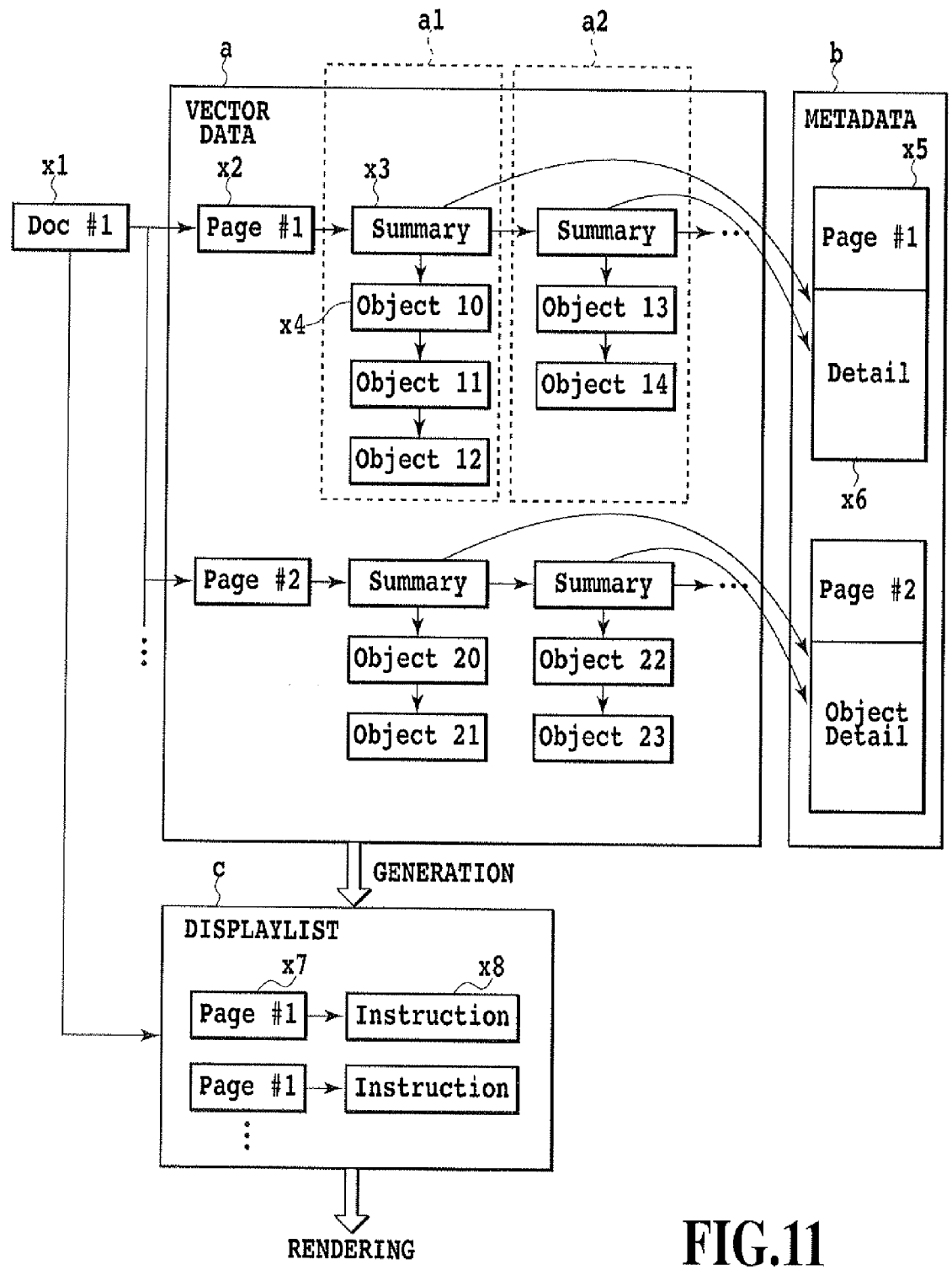
FIG. 11 is a diagram showing a data structure of metadata.

FIG. 11 shows the data structure of the document.

The document is data composed of a plurality of pages and includes data classified roughly into the vector data (a), the metadata (b), and the DL data (c), and has a hierarchical structure headed by a document header (x1). In detail, the vector data (a) includes a page header (x2), summary information (x3), and an object (x4), and the metadata (b) includes page information (x5) and detailed information (x6). Further, the DL data (c) includes a page header (x7) and an instruction for drawing development (x8). The document header (x1) describes a storing position of the vector data and a storing position of the DL data, and thereby the vector data and the DL data are associated with each other by the document header (x1).

The vector data (a) is drawing data which does not depend on a resolution (resolution-independent data) and the page header (x2) describes layout information such as a size and a direction of a page and the like. The object (x4) is linked to each of drawing data sets such as a line, a polygon, a Bezier curve, etc., and a plurality of objects is associated collectively with the summary information (x3). The summary information (x3) represents the features of the plurality of objects collectively, and describes the attribute information of the divided area explained in FIG. 7 and the like.

The metadata (b) is the additional information for searching, which is not related with the drawing processing. The page information (x5) area describes the page information such as one whether the metadata is generated from the bit map data or from the PDL data, for example, and the detailed information (x6) describes the character string (character code string) generated as the OCR information or the image information.

Further, the summary information (x3) of the vector data (a) refers to the metadata, and the detailed information (x6) can be found from the summary information (x3).

The DL data (c) is intermediate code data for the bit map development by the renderer. The page header (x7) describes a management table of drawing information (instruction) within a page and the like, and the instruction (x8) is composed of the drawing information which depends on a resolution.

<Retaining of the Input Data Type>

Next, retaining processing of the input data type will be described.

Figure 10:
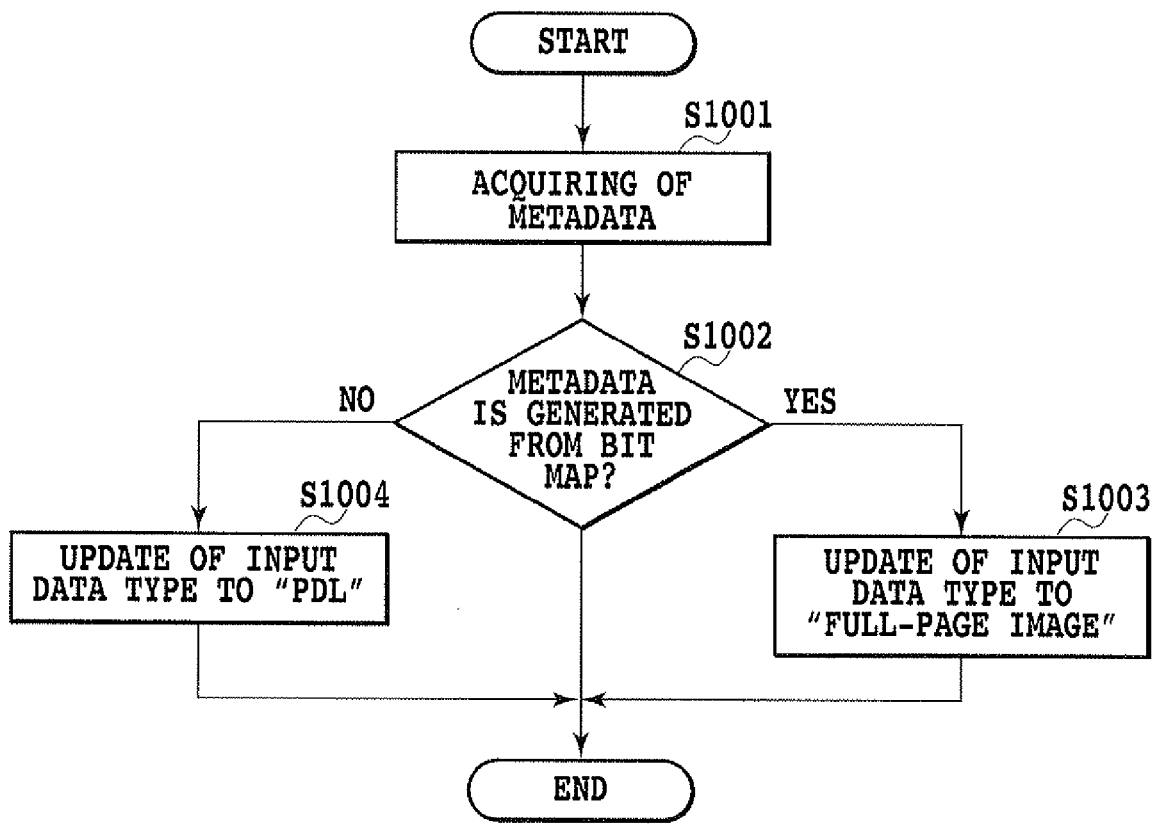
FIG. 10 is a flowchart showing retaining processing of an input data type in an embodiment.

The flowchart in FIG. 10 shows the retaining processing of the input data type.

This processing is performed in the generation of each document explained in FIG. 4 and FIG. 6.

First, Step S1001 acquires the metadata of the generated document. Subsequently, Step S1002 determines whether this document has been generated from the bit map image. When this flow starts directly after the data flow shown in FIG. 5, this document has been generated from the bit map image.

If, in Step S1002, the document is determined to have been generated from the bit map image, the process goes to Step S1003, which sets the input data type: "full-page image" in the page information of the metadata acquired in Step S1001. On the other hand, if the document is determined to have been generated from the PDL data in Step S1002, the process goes to Step S1004, which sets the input data type to be "PDL". Note that, even when the input data type is already set to be "PDL" in Step S1003, this "PDL" is overwritten with "full-page image" for the setting. Accordingly, the input data type of an image generated from the PDL data by the rendering is changed to "full-page image" by the processing in this step.

Here, detail of the input data type will be described using FIG. 12.

Figure 12:
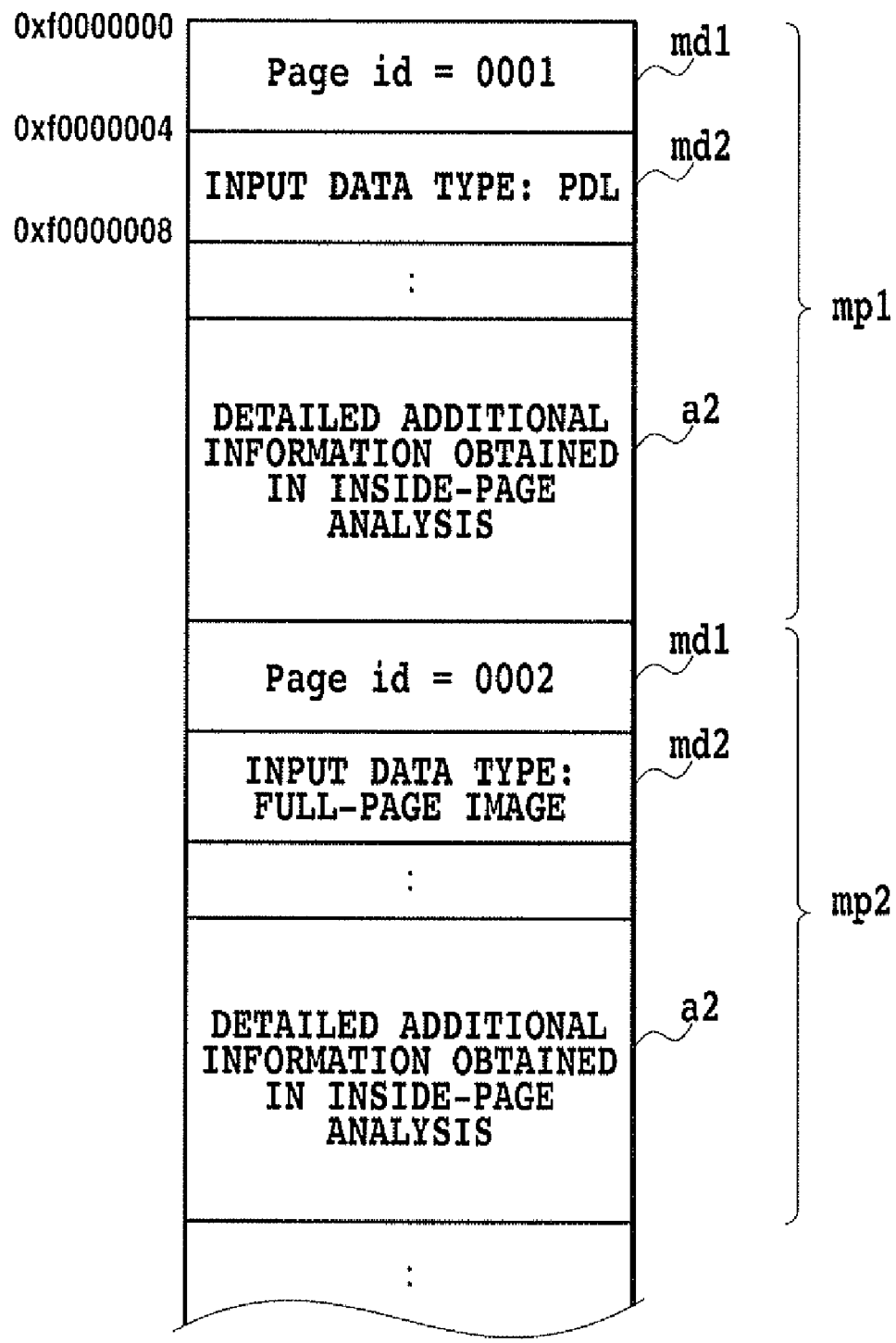
FIG. 12 is a diagram showing a data structure of metadata.

FIG. 12 shows a data structure of the metadata shown in FIG. 11.

In FIG. 12, Symbols mp1 and mp2 indicate the metadata of the first page and the second page, respectively. The metadata indicated by Symbol mp1 is composed of a page ID md1, the input data type md2, and detailed meta information a2 which is obtained by inside analysis of the page. The metadata indicated by Symbol mp2 also has the similar structure, and all the pages have the same structure. In this manner, the input data type is the metadata retained by one for each of the pages.

<Switching of Processing by the Input Data Type>

Figure 13:
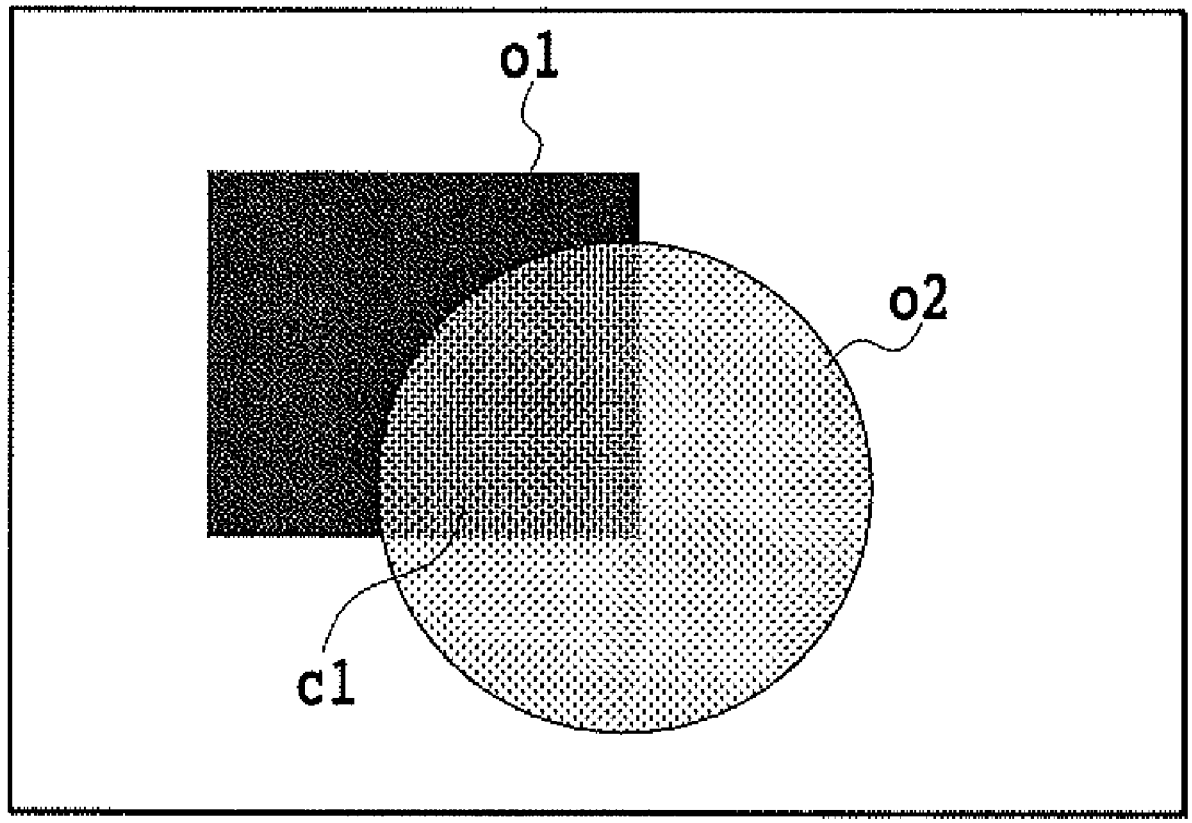
FIG. 13 is a diagram showing an example of print-out data to be used in an embodiment.

Next, features of the scan image and the PDL data will be described using FIG. 13, FIG. 14, and FIG. 15. FIG. 13 shows an example of print-out data to be used for the description here.

A black rectangle o1 is overlapped with a round figure o2 thereon, and in a part c1, where o1 and o2 overlap with each other, ground black is seen transparently.

Figure 14:
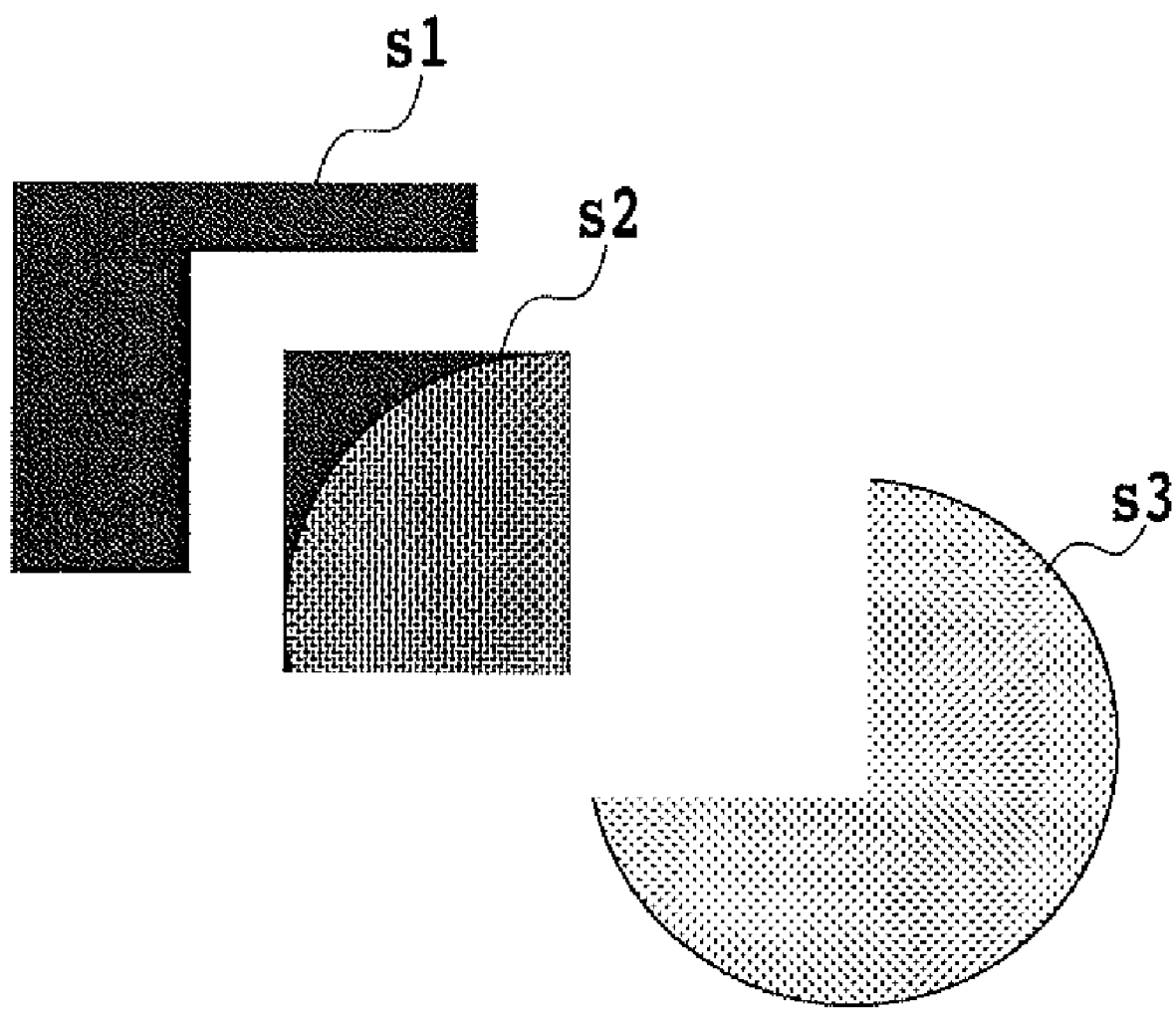
FIG. 14 is a diagram showing an example of print-out data to be used in an embodiment.
Figure 15:
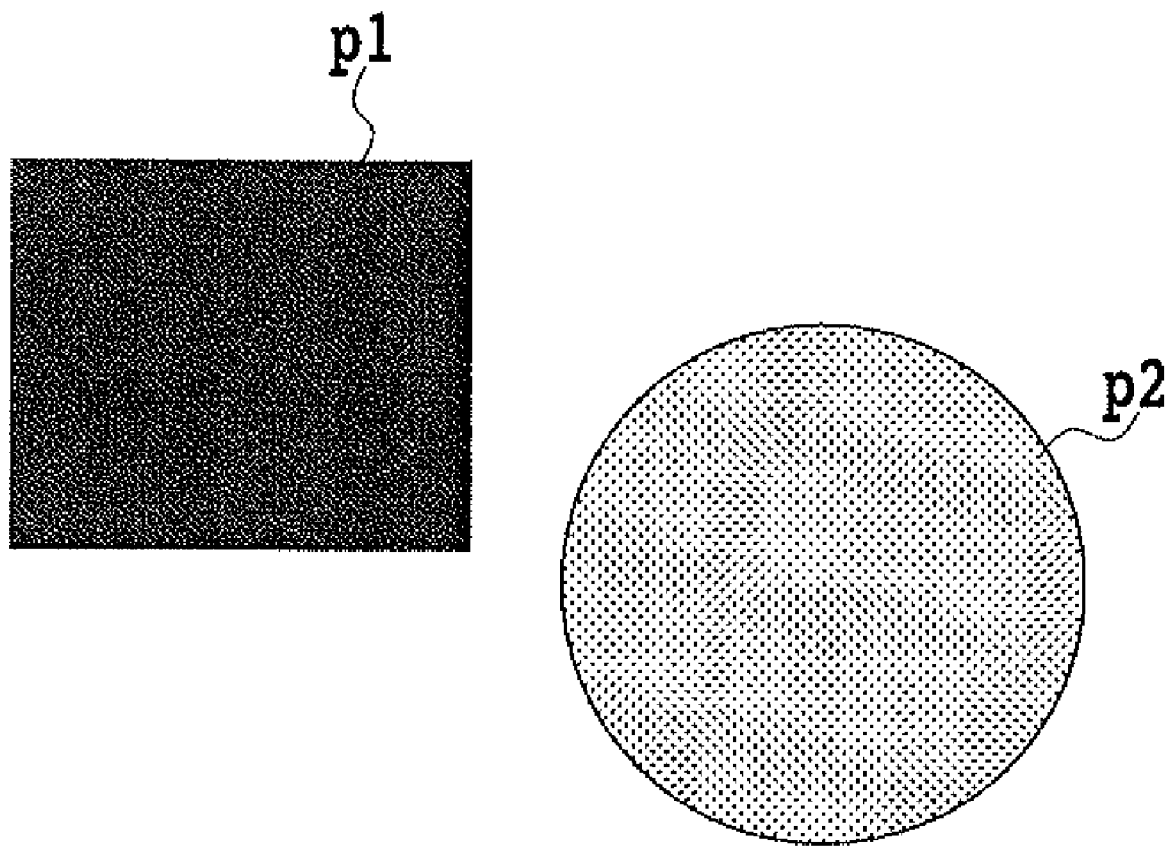
FIG. 15 is a diagram showing an example of print-out data to be used in an embodiment.

FIG. 14 shows an example for a case of inputting this picture from the scan image, and FIG. 15 shows an example for a case of inputting the picture from the PDL data.

The picture input from the scan image as an image is subjected to the vectorization processing as described above, and is divided first into three areas s1, s2, and s3 as explained in FIG. 5, by separating the overlapped area into a different area for the area dividing as shown in FIG. 14. While, usually, each of the comparatively simple areas s1 and s3 is converted into the vector data composed of a dot string and the comparatively complicated area s2 is converted into the bit map, this dividing provides an important feature that the areas s1, s2, and s3 are divided by the area dividing and thereby converted into the drawing data sets which do not overlap with one another.

On the other hand, the picture input as the PDL data is represented by two figures of a black rectangle p1 and a round figure p2 as shown in FIG. 15, and the overlap is realized by specifying that the round figure p2 has a transmittance of 50%. That is, the PDL data is not divided into areas and is a higher-level abstract representation.

Further, the areas s1, s2, and s3 area-divided in FIG. 14 and the figures p1 and p2 of FIG. 15 are converted into block structures in the document data structure as a1 and a2 shown in FIG. 11.

Figure 16:
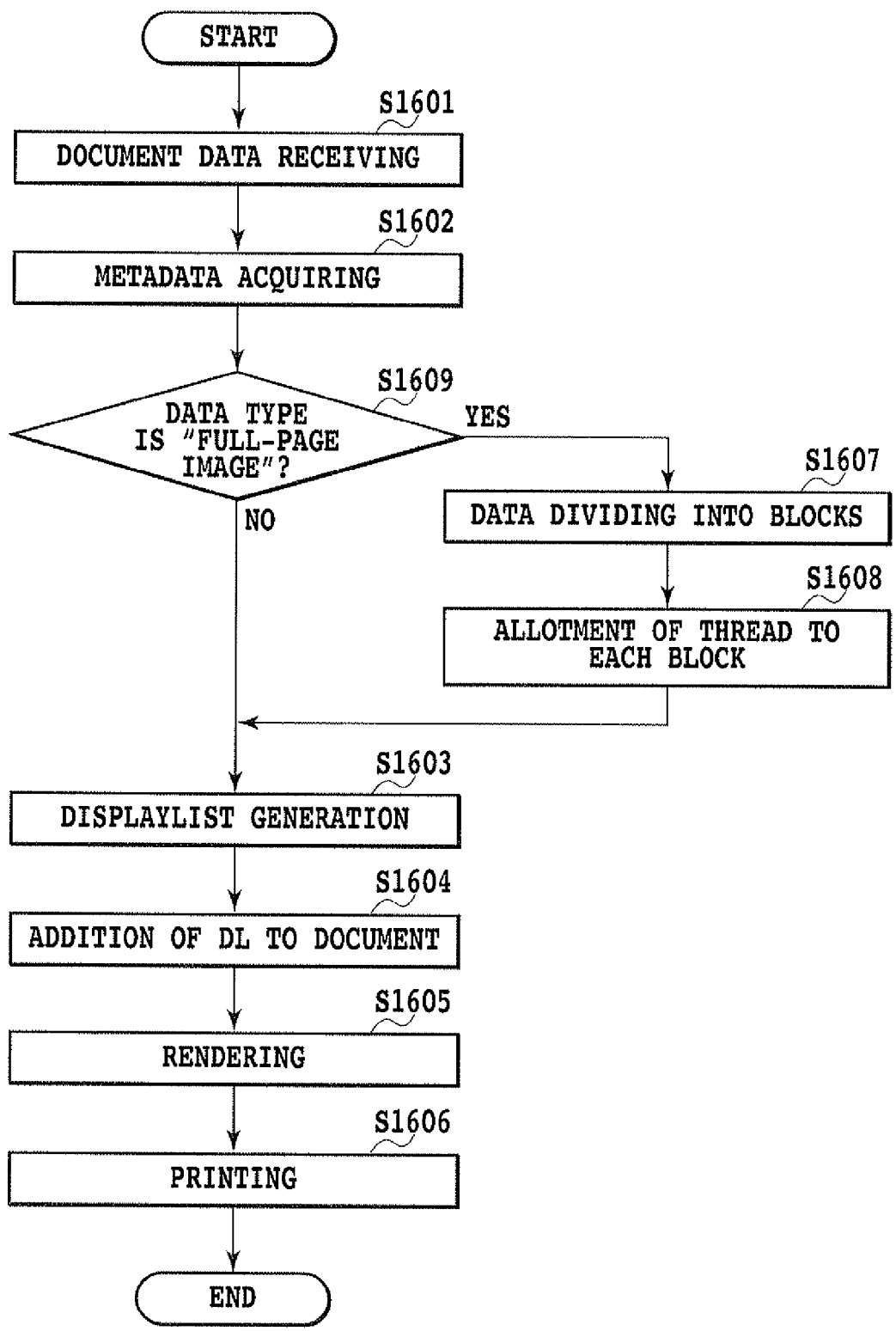
FIG. 16 is a flowchart showing an example of document print processing in an embodiment.

FIG. 16 shows document print processing. This processing prints out the generated document.

First, Step S1601 receives the document data, and Step S1602 acquires the metadata in the document data. Subsequently, Step S1609 determines whether the input data type stored in the metadata is "full-page image" or not. If the input data type is "full-page image", the process divides the page data into blocks and allots a thread to each of the blocks (each part of the page) in S1608, and then goes to S1603. On the other hand, the input data type is determined not to be "full-page image", that is, to be "PDL" in Step S1609, the process goes directly to Step S1603 and the process is continued.

Step S1603 generates the DL data from the vector data in the document. Subsequently, Step S1604 adds the generated DL data to the document, and Step S1605 renders the DL data into the bit map. Finally, Step S1606 performs print processing onto a paper medium and the process is completed.

That is, by processing the threads with a plurality of processors in the CPU 205, respectively, it is possible to perform the parallel processing for the case of the input data type "full-page image" and thereby to realize high speed processing.

[Embodiment 2]

While Embodiment 1 has realized the parallel processing by utilizing the input data type, this embodiment intends to realize higher-speed processing by switching the processing so as not to perform unnecessary processing utilizing the input data type. First, an example of processing to optimize the vector data will be described using FIG. 17A, FIG. 17B, FIG. 18A, and FIG. 18B.

Figure 17A:
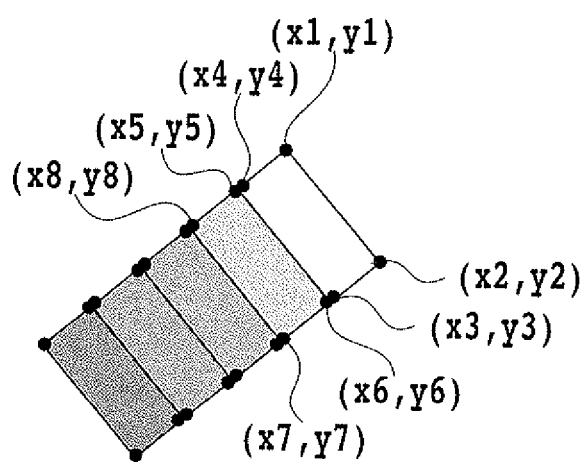
FIG. 17A is a diagram showing an example of gradation drawing.
Figure 17B:
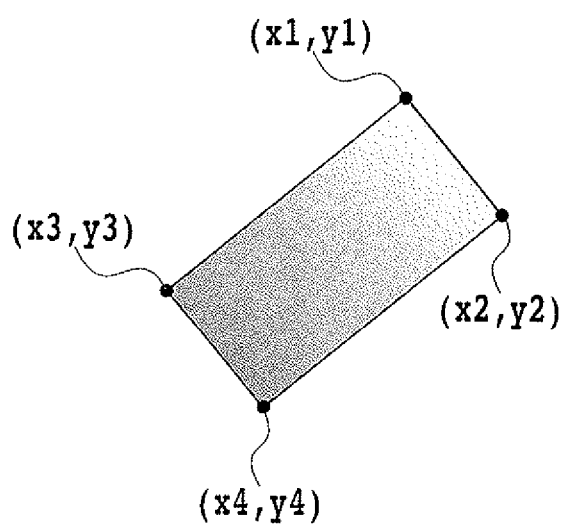
FIG. 17B is a diagram showing an example of gradation drawing.

FIG. 17A and FIG. 17B show examples of gradation drawing.

FIG. 17A represents gradation by connecting parallelograms having slightly different colors there among, and each of the parallelograms is represented by four points (x1, y1), (x2, y2), (x3, y3), and (x4, y4). In such data, the number of the parallelograms increases as the gradation becomes smoother, and the dot string data becomes huge. Accordingly, optimization processing is usually performed to put together the parallelograms into one figure as shown in FIG. 17B by checking a state of the connection and a rate of color change among the parallelograms.

Figure 18A:
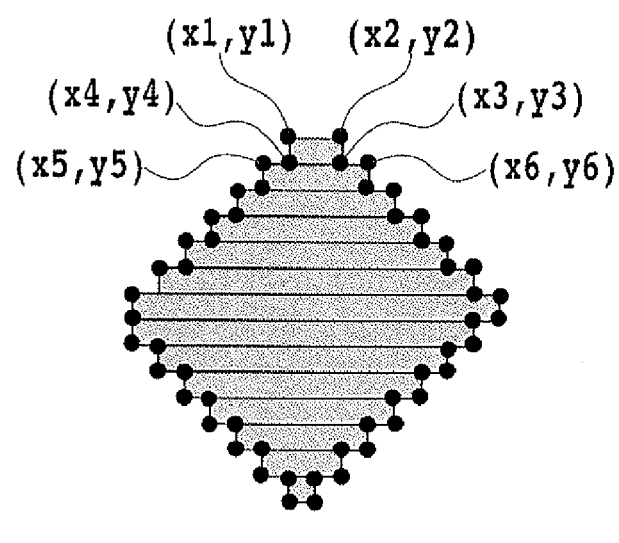
FIG. 18A is a diagram showing an example of step-like figure drawing.
Figure 18B:
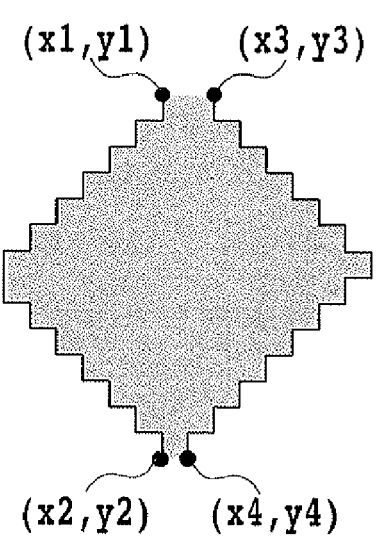
FIG. 18B is a diagram showing an example of step-like figure drawing.

FIG. 18A and FIG. 18B show examples of step-like figure drawing.

In FIG. 18A, a step-like diamond shape is represented by connecting rectangles having the same height (usually, one pixel) and different widths, and one rectangle is represented by 4 points (x1, y1), (x2, y2), (x3, y3), and (x4, y4). Such data has also the huge dot string, but, if the height is the same, the data can be represented only by differences in the x direction from (x1, y1) to (x2, y2) as shown in FIG. 18B.

The optimization processing such as one shown in FIG. 17A, FIG. 17B, FIG. 18A, or FIG. 18B can optimize the vector data to a large extent but takes a long time.

Here, such representation is performed usually on the PDL data which is an output from an application.

Accordingly, it is possible to realize higher speed processing by utilizing the input data type and omitting this optimization processing for the scan image.

Figure 19:
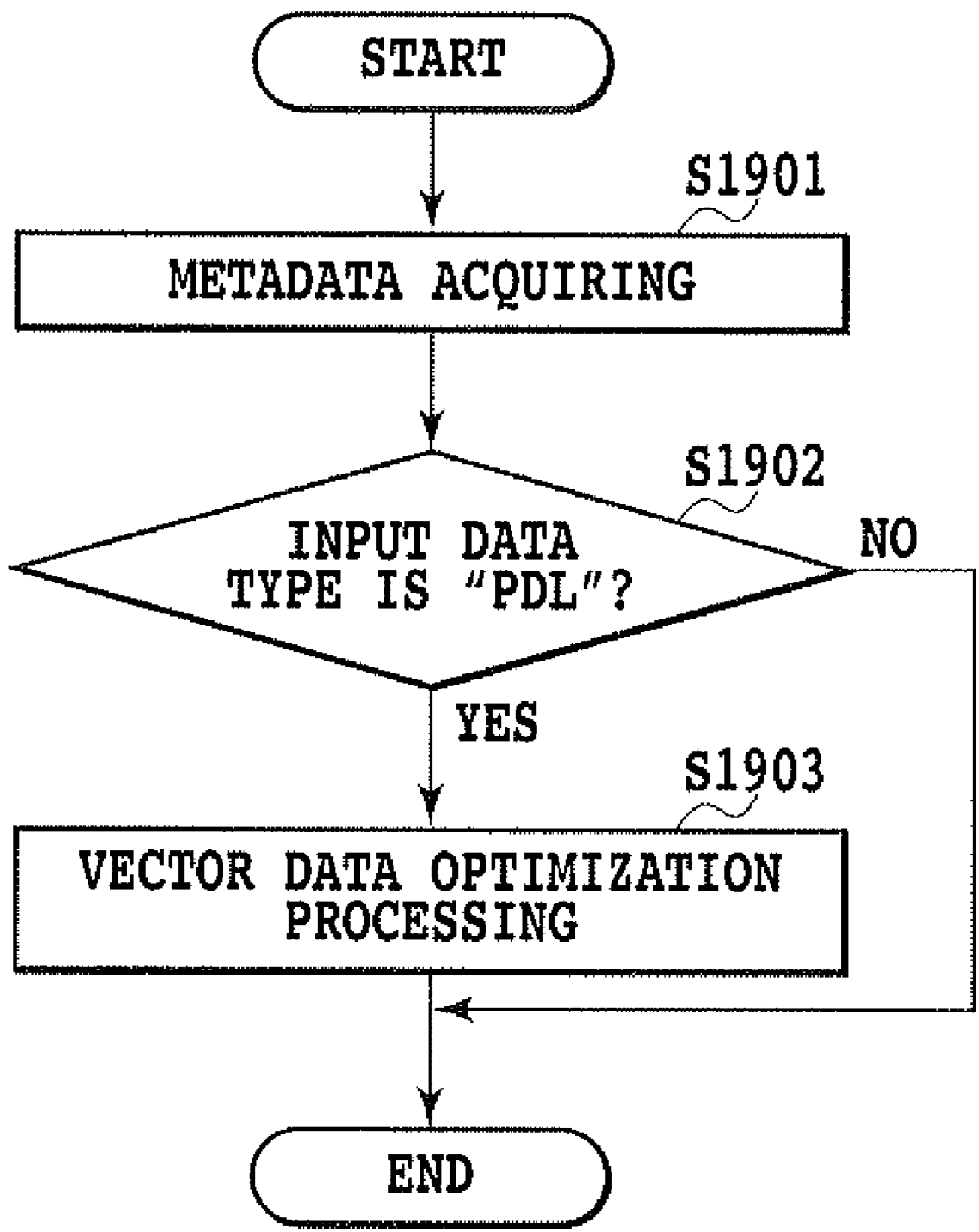
FIG. 19 is a flowchart showing switching processing in optimization processing in an embodiment.

FIG. 19 shows a flowchart of switching processing in the optimization processing.

First, Step S1901 acquires the metadata in the document.

Next, the process detects the input data type stored in the metadata acquired in Step S1901. If the input data type is "PDL", the process goes to Step S1903 and performs the above described optimization processing. On the other hand, if the input data type is determined to be "full-page image" in Step S1902, the optimization processing is not performed and the process is terminated without any other processing.

[Embodiment 3]

This embodiment improves convenience of document search by utilizing the input data type.

First, features of the character string generated from the scan image and the character string generated from the PDL data will be described using FIG. 20, FIG. 21A, FIG. 21B, FIG. 22A, and FIG. 22B.

Figure 20:
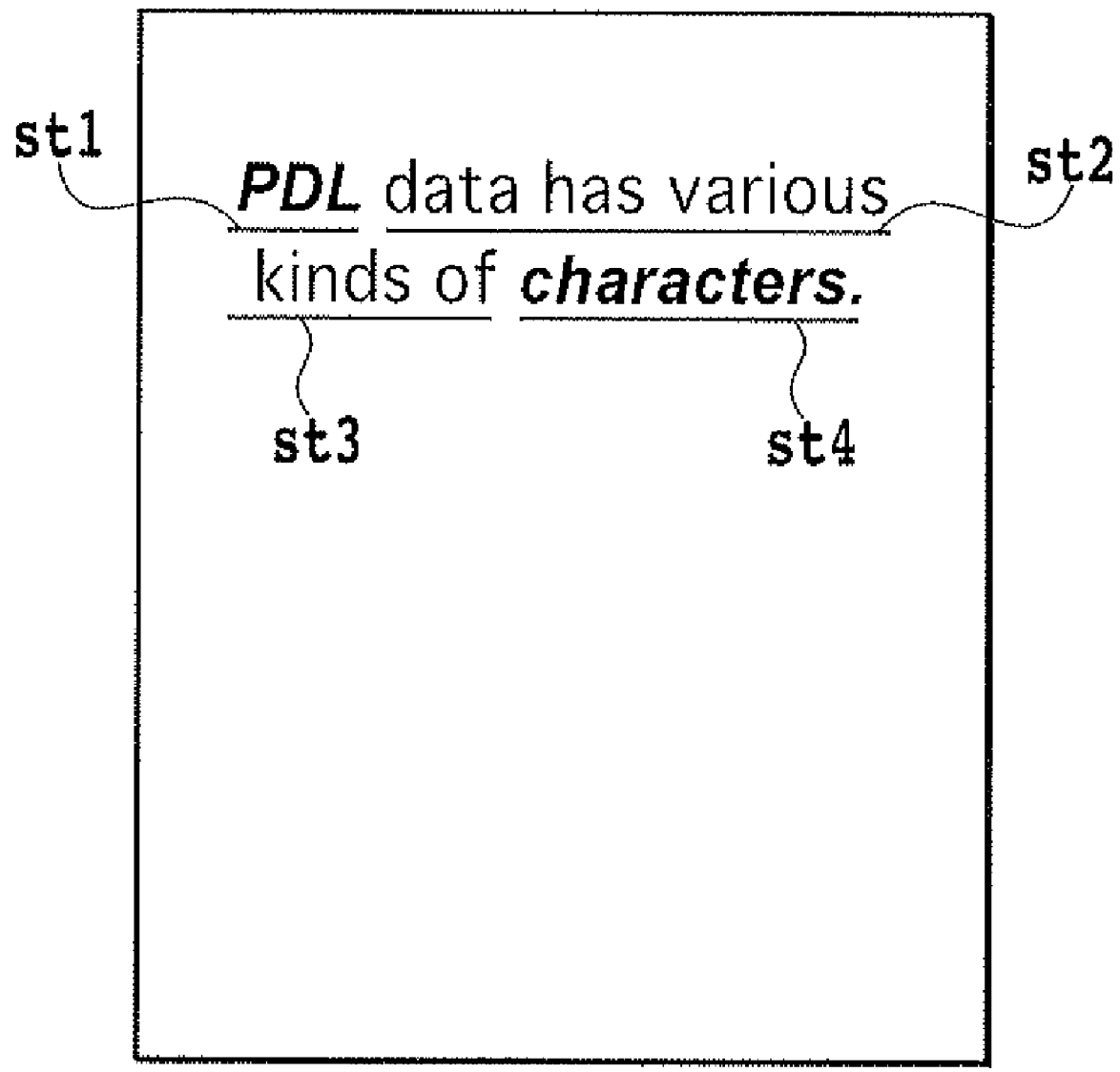
FIG. 20 is a diagram showing features of character strings generated from scan image and character strings generated from PDL data in an embodiment.

FIG. 20 shows an example of print-out data to be used for the description here.

A picture of FIG. 20 includes standard type characters st2 and st3 and italic-modified type characters st1 and st4.

FIG. 21A and FIG. 21B show examples of cases inputting this picture from the PDL data.

The standard type part of the character string input as the PDL data is input as the character code as shown in FIG. 21B. On the other hand, the italic type part is input as a download character (bit map character) as shown in FIG. 21A. It generally depends on an application for document generation whether such a decorated character is represented by the decoration-modified bit map character or by an italic modification instruction and the character code. The character part "PDL" input as the download characters is not represented by the character codes and thereby cannot be recognized as the character string.

On the other hand, when the picture is input from the scan image, the inside of the page is uniformly subjected to the OCR processing and all the characters can be recognized as the character string.

Figure 22A:
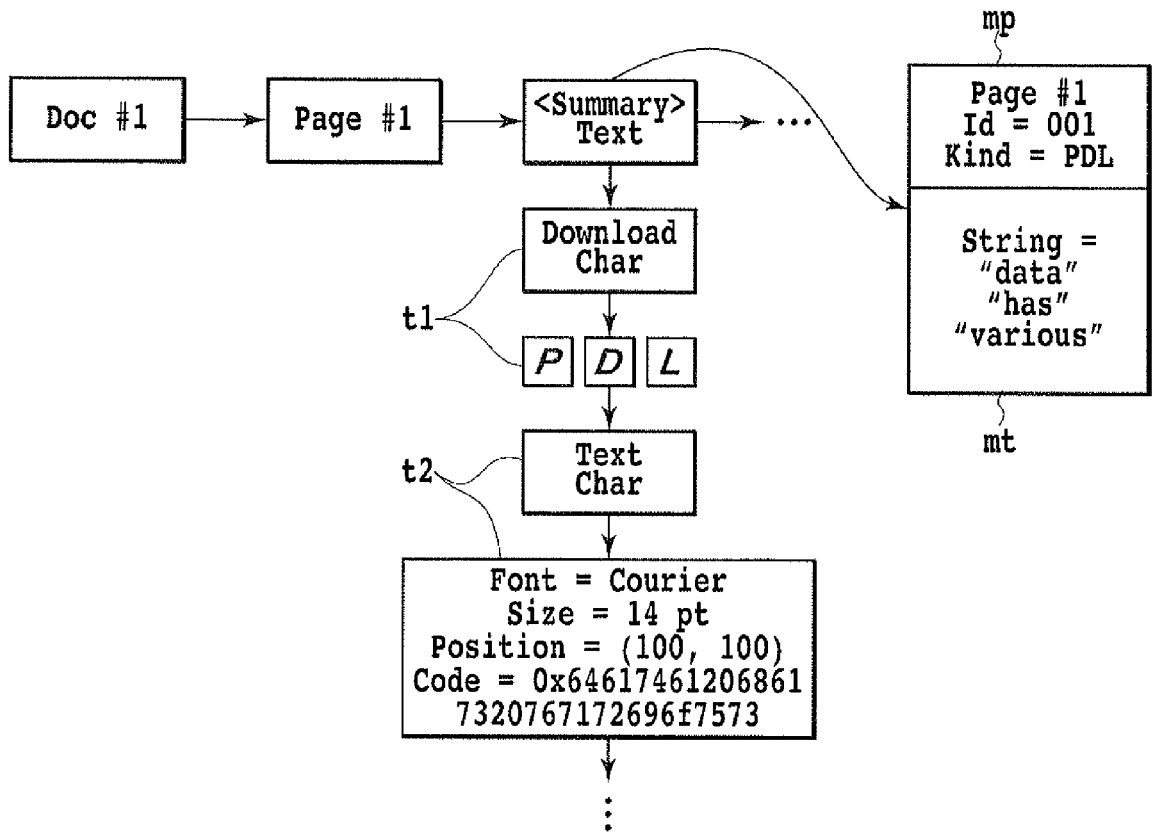
FIG. 22A is a diagram showing features of character strings generated from scan image and character strings generated from PDL data in an embodiment.
Figure 22B:
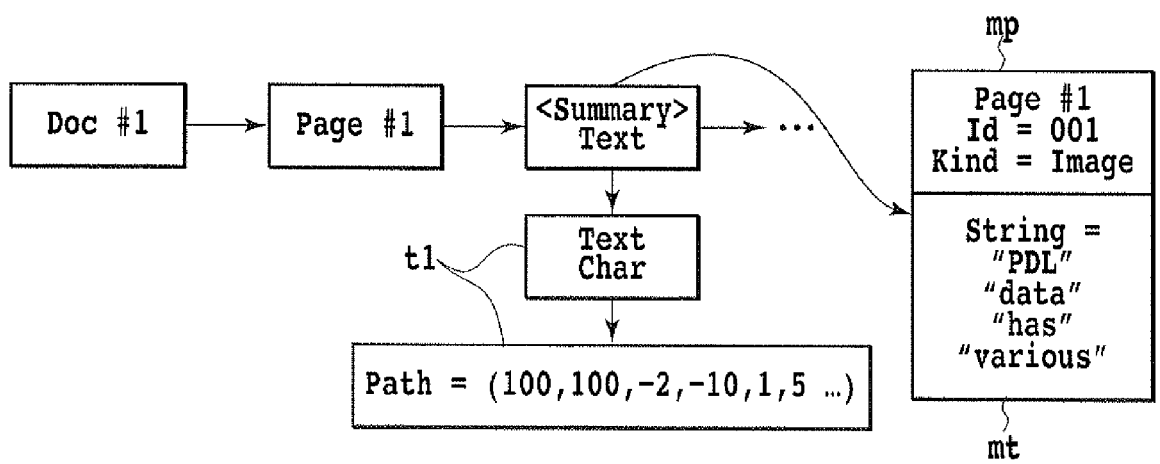
FIG. 22B is a diagram showing features of character strings generated from scan image and character strings generated from PDL data in an embodiment.

FIG. 22A and FIG. 22B show the document data when the picture of FIG. 20 is input by each of the PDL data and the scan image.

FIG. 22A shows the document data for the case of input by the PDL data, and the document data is divided into the download character "PDL" (t1) and the text character "data has various" (t2) to be stored. The metadata obtained here is only the character string obtained from the character code of t2. Therefore, the metadata mt stores only "data" "has", and "various" and the input data type of the page information mp becomes "PDL".

FIG. 22B shows the document data for the case of input from the scan image. The scan image is subjected to the vectorization processing as described above and thereby a character shape is converted into a vector dot string (t1) and the character string is extracted by the OCR processing at the same time.

Therefore, the metadata mt stores "PDL", "data", "has", and "various", and the input data type of the page information mp becomes "full-page image".

In this manner, the character string stored in the metadata has a feature that some information is lost in the generation from the PDL data compared to the generation from the scan image.

Accordingly, this method may invites confusion of an operator in a search function to pick up a document including any optional character string, by carrying out full-text search of the document. This is because, when the document is searched for the character string "PDL", the document shown in FIG. 22B (input from the scan image) is hit but the document shown in FIG. 22A (input by the PDL) is not hit, notwithstanding the same print-out result (FIG. 20).

Figure 23:
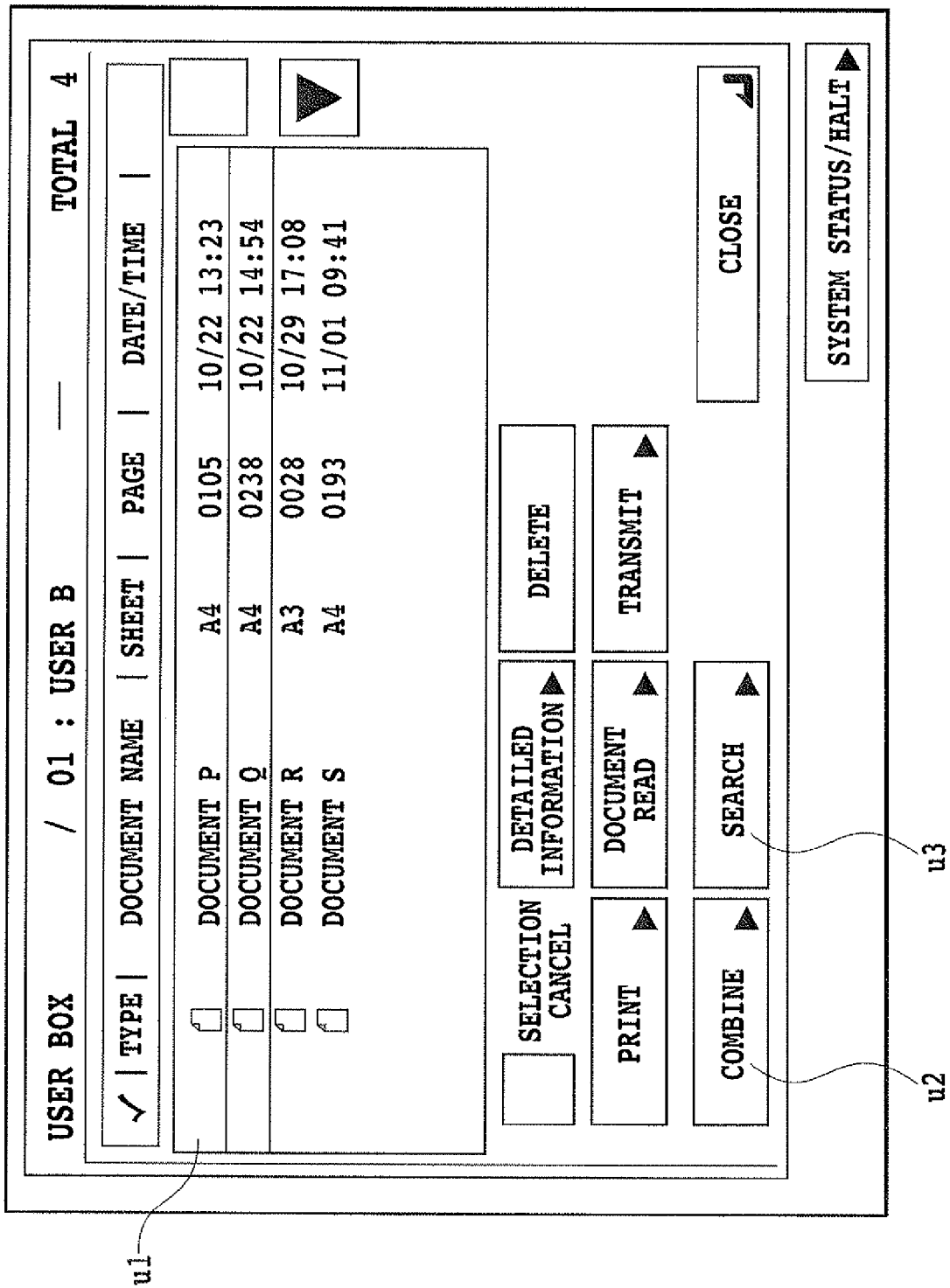
FIG. 23 is a diagram showing an example of a screen displayed on an operation section in an embodiment.

FIG. 23 shows an example of a screen displayed on the display part of the operation section in the image processing apparatus, when the operator instructs search of a document stored in a box. Symbol u1 in FIG. 23 indicates a display area for displaying a list of files in the box.

Symbol u2 indicates a composite button. When the operator selects a plurality of files on the screen, push-down of the composite button u2 connects the selected files to generate one file.

Symbol u3 indicates a search button. When the operator desires to search the file, and pushes down the search button and inputs any character string (not shown in the drawing), the file in the box is searched and a list of the result is displayed in the display area u1.

Figure 24:
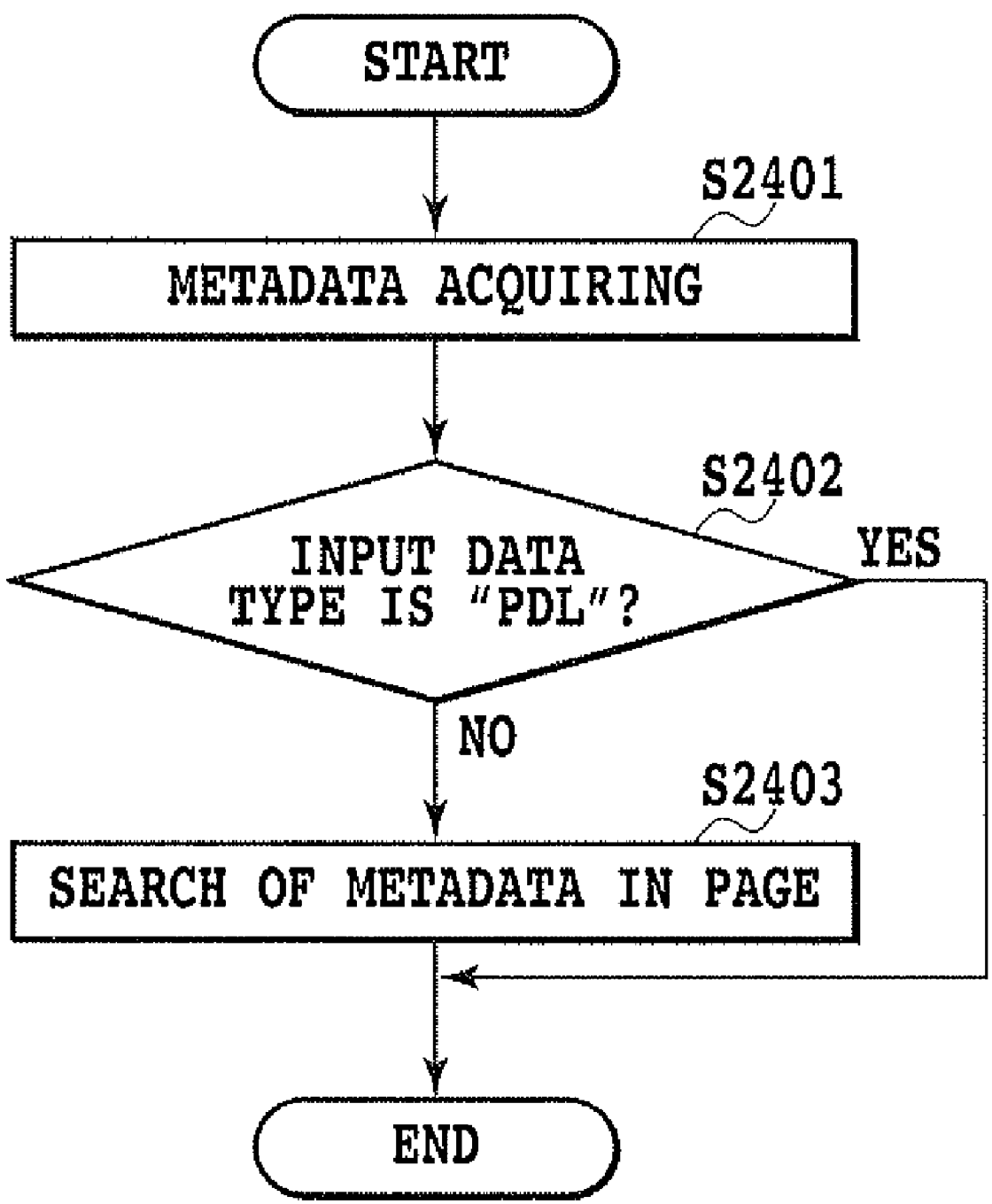
FIG. 24 is a diagram showing determination processing in search processing of an embodiment.

FIG. 24 shows a flowchart of search processing switching in the present embodiment.

This processing switches whether the generated document is to be searched or not.

First, Step S2401 acquires the metadata in the document data. Subsequently, Step S2402 determines whether the input data type stored in the metadata is "PDL" or not. If the input data type is "PDL", the process is terminated without any processing. On the other hand, if the input data type is determined not to be "PDL", that is, to be "full-page image" in Step S2402, the process goes to Step S2403, which continues the search processing of the metadata in the page.

That is, it is possible to avoid the confusion of the operator by limiting the search object to a document which has the input data type of scam image.

[Embodiment 4]

This embodiment realizes more efficient conversion processing to the universal format by utilizing the input data type.

The structure of the document generated from the scan image and PDL data is suitable for the print or the search. However, for displaying (previewing) the document on a client PC using an application, it is necessary to convert the document into a universal format such as the PDF (Portable Document Format) format. However, it is not easy to convert the document generated from the PDL data into the universal format.

For example, the PDL data, such as LIPS (LBP Image Processing System) data, is subjected to clipping (shape cutout) processing usually using logical computation called ROP (Raster Operation). However, a drawing model (drawing representation) in the PDF of the universal format does not have the ROP. Accordingly, it is necessary to replace the ROP processing by another drawing expression such as a clip dot string, but the drawing representation generated by the replacement becomes very redundant.

Figure 26A:
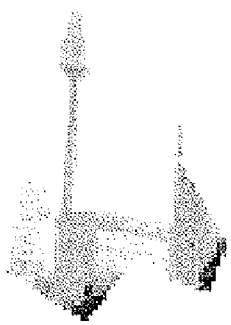
FIG. 26A is a diagram showing a difference in drawing expression between PDL and a universal format.
Figure 26B:
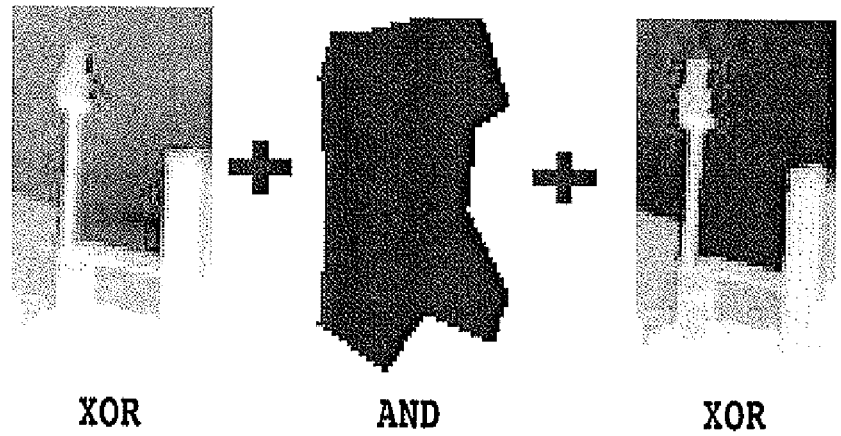
FIG. 26B is a diagram showing a difference in drawing expression between PDL and a universal format.
Figure 26C:
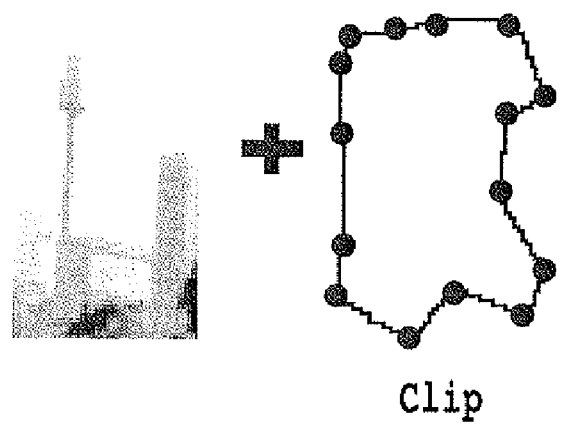
FIG. 26C is a diagram showing a difference in drawing expression between PDL and a universal format.

The above clipping processing will be described for a specific case using FIG. 26A and FIG. 26B. FIG. 26A shows an example of print-out data to be used for the description, and shows a drawing of a clipped image. FIG. 26B shows an example of the drawing representation by the PDL for drawing the data of FIG. 26A. First, an image is drawn in XOR and then a black clipping image is drawn in AND. Finally, the same image as the former image is drawn in XOR and thereby the result of FIG. 26A is obtained. FIG. 26C shows an example of the drawing representation by the universal format for drawing the data of FIG. 26A. By setting a dot string having a cutout shape for a clip area and drawing an image there, the result shown in FIG. 26A is obtained.

Figure 25:
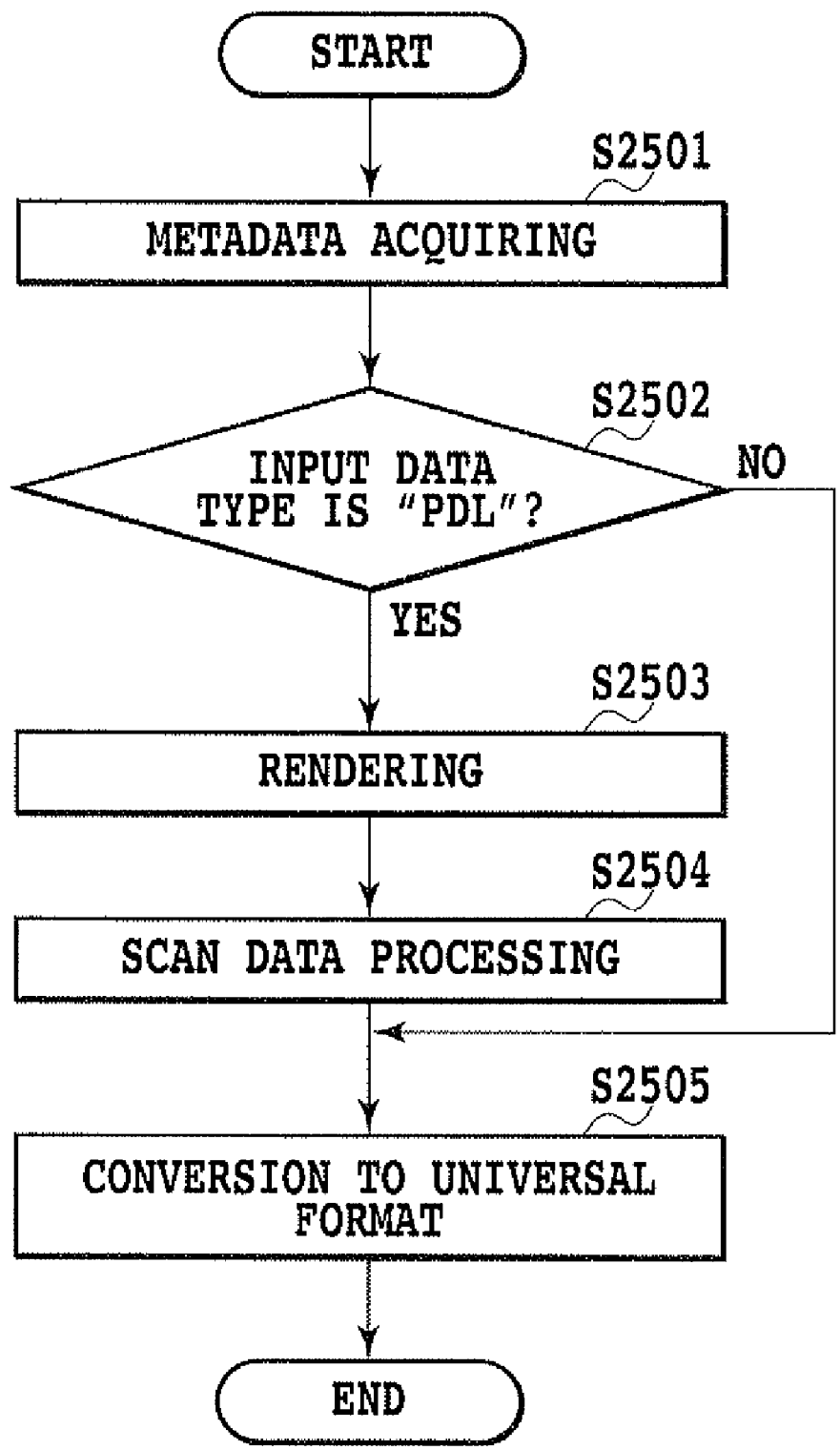
FIG. 25 is a diagram showing determination processing in universal format conversion of an embodiment.

FIG. 25 shows a flowchart of switching in the universal format conversion processing (data conversion processing) according to the present example.

This processing switches execution and non-execution of the rendering processing in the conversion of the generated document into the universal format.

First, Step S2501 acquires the metadata in the document data. Subsequently, Step S2502 determines whether the input data type stored in the metadata is "PDL" or not. If the input data type is not "PDL", the process goes directly to Step S2505, which performs the conversion processing to the universal format.

On the other hand, if the input data type is determined to be "PDL", the process goes to Step S2503, which performs the rendering processing (bit map development) on the corresponding page. That is, Step S2503 changes the input data type (PDL) to the image data. The PDL data subjected to the rendering processing becomes the full-page image data as same as the scan image, and is subjected to scan data processing in Step S2504. The scan data processing is in essence the same as the processing for the scan image described above. After that, the process goes to Step S2505, which carries out the conversion to the universal format. This conversion is the same processing as that for the case in which the process goes from Step S2502 directly to S2505 (i.e., case in which the input data type is the scan image).

That is, in the present example, the PDL image is once subjected to the rendering processing in the conversion into the universal format, and thereby can be subjected to the same conversion processing as that for the scan image, which avoids the universal format thereof from being converted into redundant drawing representation.

Note that conversion processing into the universal format performed in Step S2505 just converts the vector data of the document into the drawing representation of the universal format on one-to-one correspondence, and description thereof will be omitted.

[Other Embodiments]

While various embodiments have been described in detail hereinabove, the present invention may be applied to a system configured with a plurality of devices and also applied to an apparatus configured with a single device, such as a scanner, a printer, a PC, a copy machine, a composite machine and a facsimile machine, for example.

The present invention is achieved also by a method to supply a software program realizing each of the functions in the foregoing embodiments, directly or remotely to a system or an apparatus, and to cause a computer included in the system or the like to read and execute the supplied program code.

Accordingly, the program code itself, which is installed into the computer for causing the computer to realize the functions and processing of the present invention, realizes the present invention. That is, the computer program itself, for realizing the above functions and processing, falls within the scope of the present invention.

In this case, the computer program may be of any program types such as an object code, a program executed by an interpreter, script data supplied to an OS, etc, if a program function is included therein.

Computer-readable recording media for supplying the program include, for example, a flexible disk, a hard disk, an optical disk, a magneto-optical disk, an MO, a CD-ROM, a CD-R, a CD-RW, etc. In addition, the computer-readable recording media also include a magnetic tape, a non-volatile memory card, a ROM, a DVD (DVD-ROM and DVD-R), etc.

Further, the program may be downloaded from the Internet or intranet website using a browser of a client computer. That is, the computer program itself of the present invention, or a file including the compressed computer program with an auto-install function maybe downloaded from the website into a recording medium such as a hard disk or the like. Moreover, the present invention is realized by a method to divide the program code composing the program of the present invention into a plurality of files and to download each of the files from a different website. That is, a www server, which enables a plurality of users to download the program file for causing the computer to realize the functions and processing of the present invention, is sometimes a constituent of the present invention.

Still further, the program of the present invention may be encrypted and stored in a recording medium such as a CD-ROM and the like, and distributed to users. In this case, only a user, who has cleared a certain condition, may download key information to break the encryption from a website via the Internet or an intranet, decrypt the encrypted program using the key information for execution, and install the program into the computer.

Moreover, the computer may realize the functions of the foregoing embodiments by executing the read-out program. Here, according to an instruction of the program, an OS operating on the computer or the like may perform a part of or the whole actual processing. Obviously, this case also can realize the functions of the foregoing embodiments.

Moreover, the program read-out from the recording medium may be written into a memory which is provided to a function extension board inserted into the computer or a function extension unit connected to the computer. According to an instruction of the program, a CPU or the like, which is provided to the function extension board or the function extension unit, may perform a part of or the whole actual processing. In this manner, the functions of the foregoing embodiments may be realized.

Further, while Embodiment 1 allots the document data to a thread for each unit of the blocks, the processing unit is not limited to this block as far as the processing unit is the unit in the area dividing processing of the scan image. For example, when the area dividing processing is not planar dimension dividing but layer dividing, the document data may be allotted for each of the layers.

Still further, while Embodiment 4 performs the rendering processing in the conversion to the universal format, the rendering processing may be performed in the background of the storing process for the box. Thereby, it is possible to reduce the conversion time for the universal format.

Moreover, while Embodiment 4 performs the rendering processing in the conversion to the universal format, it may be an option to utilize attribute information obtained in the rendering processing (attribute bits such as TEXT, GRAPHIC, IMAGE, etc. which are output usually in the rendering) for the area dividing in the scan image processing.

While the present invention has been discussed with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-030587 filed Feb. 12, 2008, which is hereby incorporated by reference herein in its entirety.

What is claimed is:

1. An image processing apparatus, comprising:
    an input component constructed to input scan image data from a scanner;
    a first conversion component constructed to convert at least a part of an area in the scan image data input by the input component into vector data which does not depend on a resolution of the input component;
    a second conversion component constructed to generate metadata by executing at least one of a character recognition processing and an image recognition processing for the scan image data;
    a first document generation component constructed to generate a first document which includes the vector data converted by the first conversion component and the metadata generated by the second conversion component;
    a reception component constructed to receive PDL data from an external apparatus;
    a PDL analysis component constructed to generate vector data and metadata by analyzing the PDL data received by the reception component;
    a second document generation component constructed to generate a second document which includes the vector data generated by the PDL analysis component and the metadata generated by the PDL analysis component;
    a data type set component constructed to set data type information into the metadata of each document, the data type information indicating which of the scan image data and the PDL data has been used for generating each document; and
    a switching component constructed to switch a data processing to be executed for the document based on the data type information set in the metadata of the document.

2. The image processing apparatus according to claim 1,
    wherein the data processing is a processing for rendering the vector data included in the document into a bitmap, and wherein, in a case that the data type information of the metadata is the scan image data,
    the switching component divides the vector data included in the document into a plurality of division units, and renders the division units using a plurality of processors.

3. The image processing apparatus according to claim 1, further comprising
    an optimization component constructed to execute an optimizing process of the vector data included in a document, wherein
    the switching component executes the optimizing process for the vector data included in the document when the data type information of the metadata is the scan image data, and omits the optimizing process when the data type is the scan image data.

4. The image processing apparatus according to claim 1, further comprising
    a format conversion component constructed to convert a format of a document into a universal data format, wherein,
    in a case that the data type information of the metadata is the PDL data, the switching component renders the document into a bitmap, executes the conversion process of the first conversion component for the rendered bitmap, and executes a format conversion process of the format conversion component for the document for which the conversion process of the first conversion component has been executed.

5. The image processing apparatus according to claim 1,
    in a case that a search process is executed using the metadata of the document, the switching component performs the search process for a document that has the data type information of the scan image data, and does not perform the search process for a document that has the data type information of PDL data.

6. An image processing method, comprising the steps of:

an input step of an input component inputting scan image data from a scanner;

a first converting step of converting at least a part of an area of the scan image data input by the input component into vector data which does not depend on a resolution of the input component;

a second conversion step of generating metadata by executing at least one of a character recognition processing and an image recognition processing for the scan image data;

a first document generation step of generating a first document which includes the vector data converted in the first conversion step and the metadata generated in the second conversion step;

a reception step of receiving PDL data from an external apparatus;

a PDL analysis step of generating vector data and metadata by analyzing the PDL data received in the reception step;

a second document generation step of generating a second document which includes the vector data generated in the PDL analysis step and the metadata generated in the PDL analysis step;

a data type set step of setting data type information into the metadata of each document, the data type information indicating which of the scan image data and the PDL data has been used for generating each document; and a switching step of switching a data processing to be executed for the document based on the data type information set in the metadata of the document.

7. A non-transitory computer-readable recording medium recording a program for causing a computer to execute a method comprising the steps of:

an input step of an input component inputting scan image data from a scanner;

a first converting step of converting at least a part of an area of the scan image data input by and the input component into vector data which does not depend on a resolution of the input component;

a second conversion step of generating metadata by executing at least one of a character recognition processing and an image recognition processing for the scan image data;

a first document generation step of generating a first document which includes the vector data converted in the first conversion step and the metadata generated in the second conversion step;

a reception step of receiving PDL data from an external apparatus;

a PDL analysis step of generating vector data and metadata by analyzing the PDL data received in the reception step;

a second document generation step of generating a second document which includes the vector data generated in the PDL analysis step and the metadata generated in the PDL analysis step;

a data type set step of setting data type information into the metadata of each document, the data type information indicating which of the scan image data and the PDL data has been used for generating each document; and a switching step of switching a data processing to be executed for the document based on the data type information set in the metadata of the document.

* * * * *